US012666362B2

(12) United States Patent
Wan et al.

(10) Patent No.: US 12,666,362 B2
(45) Date of Patent: Jun. 23, 2026

(54) POWER CONSUMPTION CONTROL METHOD, APPARATUS, AND SYSTEM FOR ELECTRIC DEVICE

(71) Applicant: HUAWEI TECHNOLOGIES CO., LTD., Shenzhen (CN)

(72) Inventors: Yundong Wan, Dongguan (CN); Guoqiang Yao, Shanghai (CN); Hao Wang, Shenzhen (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 324 days.

(21) Appl. No.: 18/434,714

(22) Filed: Feb. 6, 2024

(65) Prior Publication Data

US 2024/0179632 A1     May 30, 2024

Related U.S. Application Data

(63) Continuation of application No. PCT/CN2022/114637, filed on Aug. 24, 2022.

(30) Foreign Application Priority Data

Sep. 9, 2021    (CN) .......................... 202111058059.2

(51) Int. Cl.
*H04W 52/02*          (2009.01)
(52) U.S. Cl.
CPC ............................... *H04W 52/0261* (2013.01)
(58) Field of Classification Search
CPC .................................................. H04W 52/0261

USPC ........................................................ 455/574
See application file for complete search history.

(56) References Cited

U.S. PATENT DOCUMENTS

| | | | | |
|---|---|---|---|---|
| 6,052,291 A * | 4/2000 | Suzuki | ..................... | H02M 1/36 |
| | | | | 363/21.12 |
| 6,195,271 B1 * | 2/2001 | Suzuki | ..................... | H02J 9/005 |
| | | | | 363/20 |
| 12,517,539 B2 * | 1/2026 | Forbes, Jr. | ................. | G05F 1/66 |
| 2011/0039606 A1 * | 2/2011 | Kim | ................... | H04M 1/72448 |
| | | | | 455/574 |
| 2011/0151943 A1 * | 6/2011 | Lee | .................... | H04W 52/0296 |
| | | | | 320/101 |
| 2011/0218791 A1 * | 9/2011 | Lee | ........................ | G06F 1/3203 |
| | | | | 703/16 |
| 2012/0191387 A1 * | 7/2012 | Yamanaka | ............. | G06Q 50/06 |
| | | | | 702/62 |
| 2013/0117596 A1 * | 5/2013 | Furukawa | ........... | G06F 11/3466 |
| | | | | 713/340 |

(Continued)

FOREIGN PATENT DOCUMENTS

| | | |
|---|---|---|
| CN | 109672204 A | 4/2019 |
| CN | 209217753 U | 8/2019 |

(Continued)

*Primary Examiner* — April G Gonzales

(57)          ABSTRACT

This application provides a power consumption control method, apparatus, and system for an electric device, and pertains to the field of electronic technologies. In solutions provided in this application, after a power consumption reduction instruction is received, an electric device can be controlled, based on total power consumption of the electric device and remaining electricity of a first power source, to perform a power consumption reduction operation on a target service.

20 Claims, 14 Drawing Sheets

(56) References Cited

U.S. PATENT DOCUMENTS

| | | | |
|---|---|---|---|
| 2013/0264879 A1* | 10/2013 | Shih | H02J 9/005 |
| | | | 307/64 |
| 2013/0285473 A1* | 10/2013 | Kim | H02J 9/005 |
| | | | 307/116 |
| 2014/0063861 A1* | 3/2014 | Chen | H02M 1/126 |
| | | | 363/20 |
| 2014/0183954 A1* | 7/2014 | Yoshida | H02J 3/32 |
| | | | 307/59 |
| 2015/0241896 A1* | 8/2015 | Nishibayashi | G06Q 10/06 |
| | | | 700/286 |
| 2016/0073349 A1* | 3/2016 | Mohan | H04W 76/14 |
| | | | 455/552.1 |
| 2016/0111884 A1* | 4/2016 | Kouno | H02J 3/14 |
| | | | 307/115 |
| 2017/0269679 A1* | 9/2017 | Atkinson | G05F 5/00 |
| 2019/0294132 A1* | 9/2019 | Okura | G05B 19/042 |
| 2020/0371485 A1* | 11/2020 | Matsumura | H02J 3/17 |
| 2021/0006069 A1* | 1/2021 | Zeng | H02J 3/003 |
| 2022/0131577 A1* | 4/2022 | Jung | H04B 7/0452 |

FOREIGN PATENT DOCUMENTS

| | | | |
|---|---|---|---|
| CN | 111546942 A | 8/2020 | |
| CN | 211405593 U | 9/2020 | |
| CN | 112260262 A | 1/2021 | |
| CN | 112421701 A | 2/2021 | |

* cited by examiner

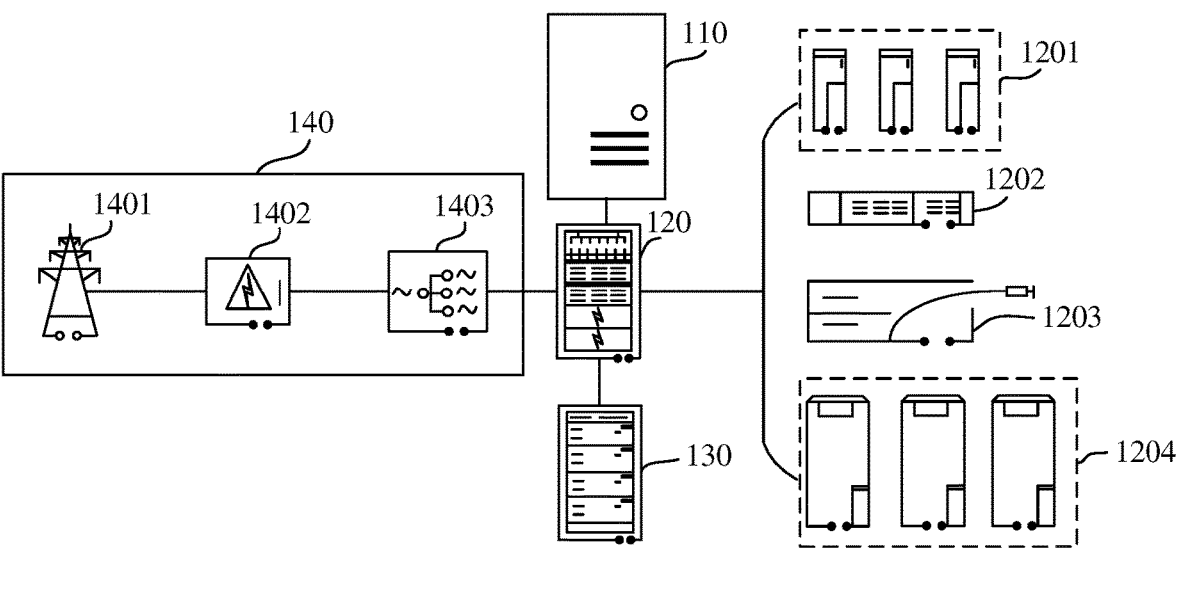

FIG. 1

Determine, based on a received power consumption reduction instruction, total power consumption of a plurality of services running in an electric device, and remaining electricity of a battery that is configured to supply power to the electric device
101

Determine, based on the total power consumption, basic electricity consumption of the plurality of services in basic running duration that starts from a time point at which the power consumption reduction instruction is received
102

Control, based on the basic electricity consumption, the remaining electricity, and estimated running duration, the electric device to perform a power consumption reduction operation on at least one target service in the plurality of services, after duration that starts from the time point at which the power consumption reduction instruction is received is greater than or equal to the basic running duration
103

FIG. 2

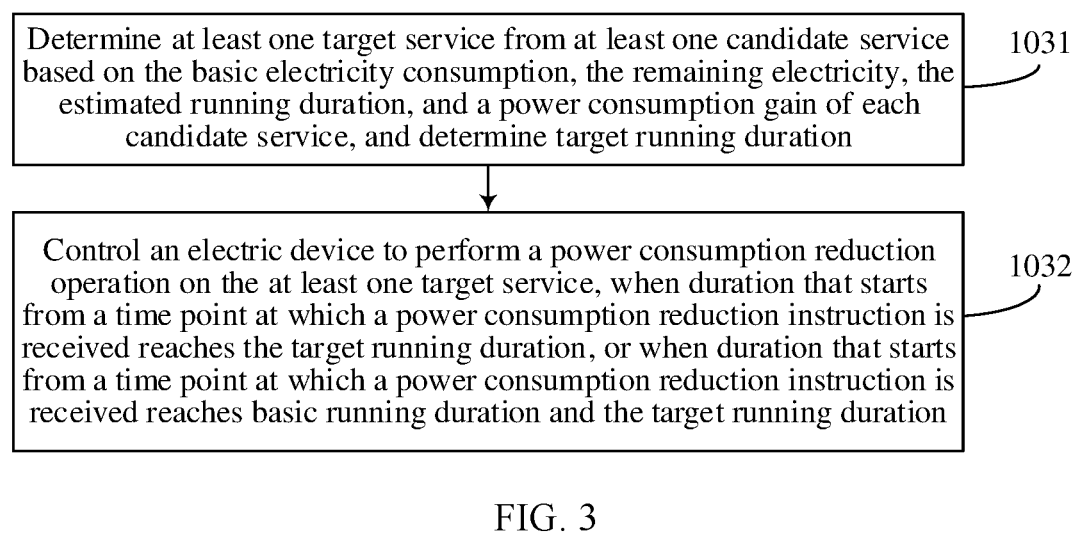

Determine at least one target service from at least one candidate service based on the basic electricity consumption, the remaining electricity, the estimated running duration, and a power consumption gain of each candidate service, and determine target running duration　1031

Control an electric device to perform a power consumption reduction operation on the at least one target service, when duration that starts from a time point at which a power consumption reduction instruction is received reaches the target running duration, or when duration that starts from a time point at which a power consumption reduction instruction is received reaches basic running duration and the target running duration　1032

FIG. 3

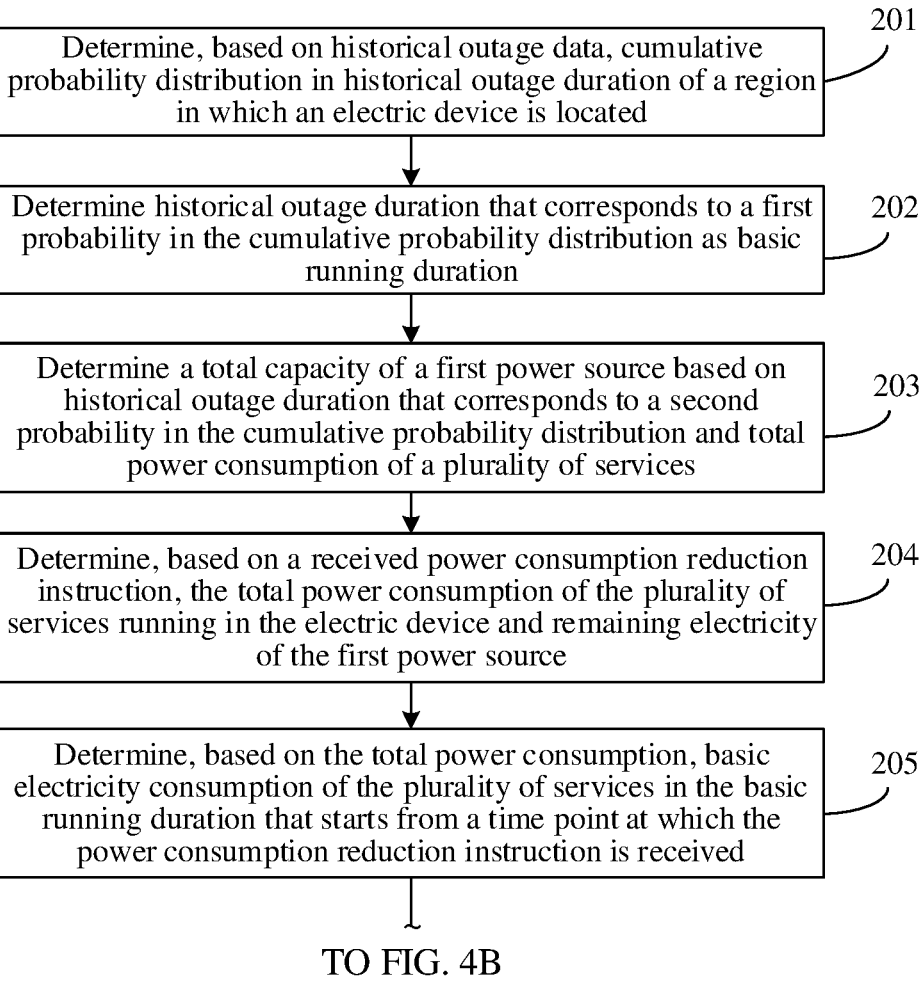

Determine, based on historical outage data, cumulative probability distribution in historical outage duration of a region in which an electric device is located — 201

Determine historical outage duration that corresponds to a first probability in the cumulative probability distribution as basic running duration — 202

Determine a total capacity of a first power source based on historical outage duration that corresponds to a second probability in the cumulative probability distribution and total power consumption of a plurality of services — 203

Determine, based on a received power consumption reduction instruction, the total power consumption of the plurality of services running in the electric device and remaining electricity of the first power source — 204

Determine, based on the total power consumption, basic electricity consumption of the plurality of services in the basic running duration that starts from a time point at which the power consumption reduction instruction is received — 205

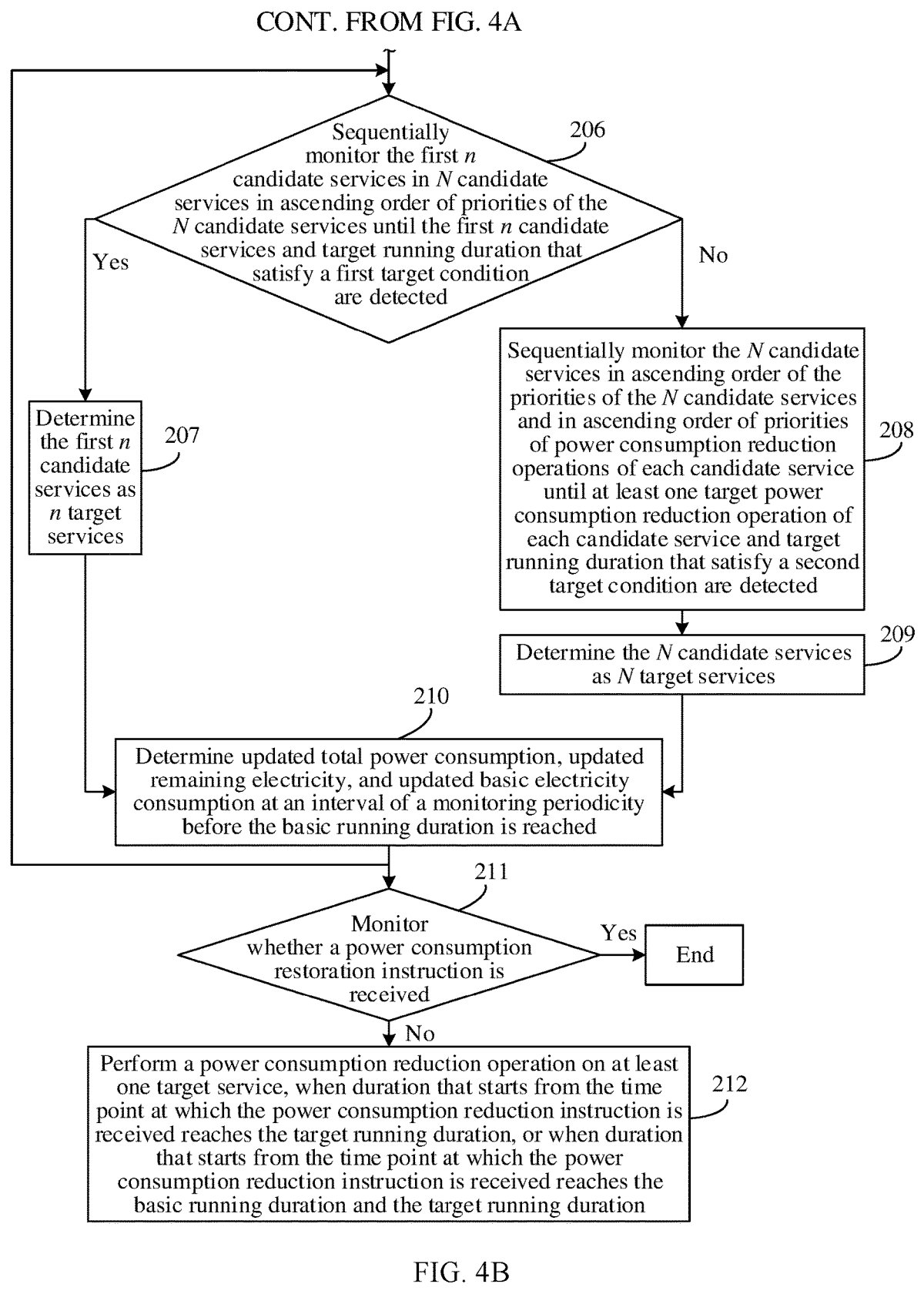

CONT. FROM FIG. 4A

Sequentially monitor the first $n$ candidate services in $N$ candidate services in ascending order of priorities of the $N$ candidate services until the first $n$ candidate services and target running duration that satisfy a first target condition are detected — 206

Yes

No

Determine the first $n$ candidate services as $n$ target services — 207

Sequentially monitor the $N$ candidate services in ascending order of the priorities of the $N$ candidate services and in ascending order of priorities of power consumption reduction operations of each candidate service until at least one target power consumption reduction operation of each candidate service and target running duration that satisfy a second target condition are detected — 208

Determine the $N$ candidate services as $N$ target services — 209

Determine updated total power consumption, updated remaining electricity, and updated basic electricity consumption at an interval of a monitoring periodicity before the basic running duration is reached — 210

Monitor whether a power consumption restoration instruction is received — 211

Yes

End

No

Perform a power consumption reduction operation on at least one target service, when duration that starts from the time point at which the power consumption reduction instruction is received reaches the target running duration, or when duration that starts from the time point at which the power consumption reduction instruction is received reaches the basic running duration and the target running duration — 212

FIG. 4B

POWER CONSUMPTION CONTROL METHOD, APPARATUS, AND SYSTEM FOR ELECTRIC DEVICE

CROSS-REFERENCE TO RELATED APPLICATIONS

This application is a continuation of International Application No. PCT/CN2022/114637, filed on Aug. 24, 2022, which claims priority to Chinese Patent Application No. 202111058059.2, filed on Sep. 9, 2021. The disclosures of the aforementioned applications are hereby incorporated by reference in their entireties.

TECHNICAL FIELD

This application relates to the field of electronic technologies, and in particular to a power consumption control method, apparatus, and system for an electric device.

BACKGROUND

An electric device in a communication site is usually powered by mains electricity. In addition, a backup power source is further disposed in the communication site. The backup power source is configured to supply power to the electric device when a mains outage occurs. An electric device in a communication base station includes a baseband unit (BBU), a remote radio unit (RRU), and the like.

In the conventional technology, a backup power source capacity is usually determined based on maximum outage duration of a region in which a communication site is located, and power consumption of an electric device in the communication site. In other words, the backup power source capacity can ensure continuous power supply for the electric device within the maximum outage duration after a mains outage, to ensure that the electric device can run normally within the maximum outage duration after the mains outage. The maximum outage duration is obtained through statistics collection based on historical outage duration of the region in which the communication site is located.

However, as the power consumption of the electric device in the communication site increases, a requirement for the backup power source capacity is increasingly high. Consequently, high costs of the backup power source are caused.

SUMMARY

This application provides a power consumption control method, apparatus, and system for an electric device, to resolve a technical problem of high costs of a power source of the electric device.

According to an aspect, a power consumption control method for an electric device is provided. The method includes: determining, based on a received power consumption reduction instruction, total power consumption of a plurality of services running in an electric device, and remaining electricity of a first power source that is configured to supply power to the electric device; determining, based on the total power consumption, basic electricity consumption of the plurality of services in basic running duration that starts from a time point at which the power consumption reduction instruction is received; and controlling, based on the basic electricity consumption, the remaining electricity, and estimated running duration, the electric device to perform a power consumption reduction operation on at least one target service in the plurality of services, after duration that starts from the time point at which the power consumption reduction instruction is received is greater than or equal to the basic running duration. The estimated running duration is greater than the basic running duration. A sum of the basic electricity consumption and the target electricity consumption is less than or equal to the remaining electricity. The target electricity consumption is electricity consumption of the plurality of services in a time period between the basic running duration and the estimated running duration when the power consumption reduction operation is performed on the at least one target service in the plurality of services.

In the power consumption control method for an electric device according to this application, the electric device can be controlled, based on the total power consumption of the electric device and the remaining electricity of the first power source, to perform the power consumption reduction operation on the at least one target service, to reduce power consumption of the electric device. In this way, duration in which the first power source supplies power to the electric device can reach the estimated running duration when a capacity of the first power source is not increased, thereby effectively reducing costs of the first power source.

Optionally, the plurality of services include at least one candidate service on which the power consumption reduction operation can be performed. A process of controlling, based on the basic electricity consumption, the remaining electricity, and the estimated running duration, the electric device to perform the power consumption reduction operation on the at least one target service in the plurality of services, after duration that starts from the time point at which the power consumption reduction instruction is received is greater than or equal to the basic running duration may include: determining at least one target service from the at least one candidate service based on the basic electricity consumption, the remaining electricity, the estimated running duration, and a power consumption gain of each candidate service, and determining target running duration, where the target running duration is less than the estimated running duration, and greater than or equal to the basic running duration; and controlling the electric device to perform the power consumption reduction operation on the at least one target service, when the duration that starts from the time point at which the power consumption reduction instruction is received reaches the target running duration, or when the duration that starts from the time point at which the power consumption reduction instruction is received reaches the basic running duration and the target running duration, where the power consumption gain refers to power consumption that can be reduced by performing the power consumption reduction operation on the candidate service, and the target electricity consumption is determined based on the total power consumption and the power consumption gain of the at least one target service.

The remaining electricity of the first power source and the power consumption gain of the candidate service are used to determine the target service on which the power consumption reduction operation needs to be performed, and the target running duration that indicates an execution moment of the power consumption reduction operation. This may ensure that the duration in which the first power source supplies power to the electric device can reach the estimated running duration.

Optionally, the plurality of services include N candidate services, where N is an integer greater than 1. A process of determining the at least one target service from the at least one candidate service based on the basic electricity consumption, the remaining electricity, the estimated running duration, and the power consumption gain of each candidate service, and determining the target running duration may include: sequentially monitoring the first n candidate services in the N candidate services in ascending order of priorities of the N candidate services until the first n candidate services and target running duration that satisfy a first target condition are detected. The first target condition includes:

$$P_0 \times T_0 + \left(P_0 - \sum_{i=1}^{n-1} P_i\right) \times (T - T_0) + \left(P_0 - \sum_{i=1}^{n} P_i\right) \times (T_p - T) \le C_0 \times V,$$

and $T \ge T_0$.

$P_0$ is the total power consumption, $T_0$ is the basic running duration, $P_i$ is a power consumption gain of an $i^{th}$ candidate service, T is the target running duration, $T_p$ is the estimated running duration, $C_0$ is the remaining electricity, V is a voltage of the first power source, i is a positive integer that is not greater than n, and n is a positive integer that is not greater than N.

Correspondingly, the process of controlling the electric device to perform the power consumption reduction operation on the at least one target service, when the duration that starts from the time point at which the power consumption reduction instruction is received reaches the target running duration, or when the duration that starts from the time point at which the power consumption reduction instruction is received reaches the basic running duration and the target running duration may include: if n is equal to 1, controlling the electric device to perform the power consumption reduction operation on a $1^{st}$ target service in the n target services, when the duration that starts from the time point at which the power consumption reduction instruction is received reaches the target running duration; or if n is greater than 1, performing the power consumption reduction operation on the first n−1 target services in the n target services when the duration that starts from the time point at which the power consumption reduction instruction is received reaches the basic running duration, and controlling the electric device to perform the power consumption reduction operation on an $n^{th}$ target service in the n target services, when the duration that starts from the time point at which the power consumption reduction instruction is received reaches the target running duration.

The power consumption control device determines, in ascending order of priorities of the plurality of services running in the electric device, the target service on which the power consumption reduction operation is to be performed, and controls, in ascending order of the priorities, to perform the power consumption reduction operation on the at least one target service. In this way, long duration of lossless running of a service with a high priority can be ensured, thereby effectively ensuring performance of the electric device.

Optionally, at least one candidate service in the N candidate services has a plurality of power consumption reduction operations with different priorities. $P_i$ in the first target condition is a power consumption gain obtained by performing a power consumption reduction operation with a lowest priority on the $i^{th}$ candidate service. The method further includes: if the first n candidate services and the target running duration that satisfy the first target condition are not detected, sequentially monitoring the N candidate services in ascending order of the priorities of the N candidate services and in ascending order of priorities of power consumption reduction operations of each candidate service until at least one target power consumption reduction operation of each candidate service and target running duration that satisfy a second target condition are detected, where the second target condition includes:

$$P_0 \times T_0 + (P_0 - A) \times (T - T_0) + (P_0 - B) \times (T_p - T) \le C_0 \times V,$$

and $T \ge T_0$, where $$A = \sum_{j=1}^{m_i-1} \sum_{i=1}^{N} (P_{i\_j} - P_{i\_j-1}) + \sum_{i=1}^{n-1} (P_{i\_j} - P_{i\_j-1}) \bigg| j = m_i, \text{ and}$$

$$B = \sum_{j=1}^{m_i-1} \sum_{i=1}^{N} (P_{i\_j} - P_{i\_j-1}) + \sum_{i=1}^{n} (P_{i\_j} - P_{i\_j-1}) \bigg| j = m_i, \text{ where}$$

$M_i$ is a quantity of power consumption reduction operations with different priorities of the $i^{th}$ candidate service, the first $m_i$ power consumption reduction operations of the $i^{th}$ candidate service are target power consumption reduction operations of the $i^{th}$ candidate service, $m_i$ is a positive integer that is not greater than $M_i$, j is a positive integer that is not greater than $m_i$, $P_{i\_j}$ is a power consumption gain obtained by performing the $1^{st}$ power consumption reduction operation to $j^{th}$ power consumption reduction operation on the $i^{th}$ candidate service, and T is the target running duration; and determining the N candidate services as N target services.

Correspondingly, the process of controlling the electric device to perform the power consumption reduction operation on the at least one target service, when the duration that starts from the time point at which the power consumption reduction instruction is received reaches the target running duration, or when the duration that starts from the time point at which the power consumption reduction instruction is received reaches the basic running duration and the target running duration may include:

controlling the electric device to perform at least one target power consumption reduction operation on each target service, when the duration that starts from the time point at which the power consumption reduction instruction is received reaches the basic running duration, where for an $i^{th}$ target service, if i=n, a target power consumption reduction operation performed on the $i^{th}$ target service is the first $m_i-1$ power consumption reduction operations in $M_i$ power consumption reduction operations with different priorities; or if i≠n, a target power consumption reduction operation performed on the $i^{th}$ target service is the first $m_i$ power consumption reduction operations in $M_i$ power consumption reduction operations with different priorities; and controlling the electric device to perform an $m_n^{th}$ power consumption reduction operation on an $n^{th}$ target service in the N target services, when the duration that starts from the time point at which the power consumption reduction instruction is received reaches the target running duration.

The power consumption control device determines, in ascending order of priorities of power consumption reduction operations of the target services, at least one power consumption reduction operation of each target service that satisfies the second target condition, and controls, in ascending order of the priorities of the power consumption reduction operations, the electric device to perform the power consumption reduction operation on the target service. In this way, for a target service with a high priority, it can be ensured that execution of a power consumption reduction operation that greatly affects performance of the target service can be postponed, thereby effectively reducing impact of the power consumption reduction operation on the performance of the target service with the high priority.

Optionally, before the controlling the electric device to perform the power consumption reduction operation on the at least one target service, the method may further include: determining updated total power consumption, updated remaining electricity, and updated basic electricity consumption at an interval of a monitoring periodicity; re-performing, based on the updated basic electricity consumption, the updated remaining electricity, the estimated running duration, and the power consumption gain of each candidate service, the operation of determining at least one target service and determining target running duration; and controlling, if the at least one re-determined target service and/or the re-determined target duration change/changes, the electric device to perform the power consumption reduction operation based on at least one changed target service and/or changed target duration.

The remaining electricity of the first power source and the total power consumption of the electric device are re-determined at an interval of a monitoring periodicity. This can ensure accuracy of the target service and the target running duration that are determined by the power consumption control device.

Optionally, before the duration that starts from the time point at which the power consumption reduction instruction is received reaches the basic running duration, the method further includes: if a power consumption restoration instruction is received, forbidding the electric device to perform the power consumption reduction operation on the at least one target service in the plurality of services.

If the power consumption control device receives the power consumption restoration instruction, it may be determined that power consumption of the electric device no longer needs to be adjusted. Therefore, the electric device can be forbidden to perform the power consumption reduction operation. In this way, lossless running of the plurality of services in the electric device can be ensured.

Optionally, the electric device is further connected to a second power source. The first power source is a backup power source of the second power source. The power consumption reduction instruction is an instruction that indicates a power failure of the second power source.

When the power failure of the second power source occurs, the power consumption reduction instruction may instruct the power consumption control device to control the electric device to perform the power consumption reduction operation on the target service, to reduce the power consumption of the electric device, and ensure reliability of supplying power to the electric device by the first power source.

Optionally, the second power source is a mains power source. The method further includes: determining, based on historical outage data, cumulative probability distribution of historical outage duration of a region in which the electric device is located; and determining historical outage duration that corresponds to a first probability in the cumulative probability distribution as the basic running duration, where a value of the first probability ranges from 70% to 80%.

Because the value of the first probability ranges from 70% to 80%, a probability that outage duration of the region in which the electric device is located is less than or equal to the historical outage duration that corresponds to the first probability is high. Correspondingly, the historical outage duration that corresponds to the first probability is determined as the basic running duration. This can ensure that in most outage scenarios, the plurality of services running in the electric device can survive an outage in a lossless manner, to effectively ensure the performance of the electric device.

Optionally, the method further includes: determining a total capacity of the first power source based on historical outage duration that corresponds to a second probability in the cumulative probability distribution and the total power consumption of the plurality of services, where a value of the second probability ranges from 85% to 95%.

A total capacity of the first power source that is configured based on the historical outage duration that corresponds to the second probability is less than a total capacity of the first power source that is configured based on maximum outage duration in the historical outage data. Therefore, the costs of the first power source can be effectively reduced. With reference to the power consumption control method according to this embodiment of this application, it can be ensured that the duration in which the first power source supplies power to the electric device can still reach the estimated running duration (namely, the maximum outage duration in the historical outage data).

According to another aspect, a power consumption control device for an electric device is provided. The power consumption control device includes at least one module, and the at least one module may be configured to implement the power consumption control method for an electric device according to the foregoing aspect.

According to still another aspect, a power consumption control device for an electric device is provided. The power consumption control device includes a memory, a processor, and a computer program that is stored in the memory and can be run on the processor. When executing the computer program, the processor performs the power consumption control method for an electric device according to the foregoing aspect.

According to yet another aspect, a computer-readable storage medium is provided. The computer-readable storage medium stores a computer program. When the computer program is run on a processor, the processor is enabled to perform the power consumption control method for an electric device according to the foregoing aspect.

According to yet another aspect, a computer program product including instructions is provided. The computer program product includes the instructions. When the computer program product runs on a computer, the computer is enabled to perform the power consumption control method for an electric device according to the foregoing aspect.

According to yet another aspect, a power consumption control system for an electric device is provided. The power consumption control system for an electric device includes: the power consumption control device according to the foregoing aspect, an electric device, and a first power source configured to supply power to the electric device.

In conclusion, embodiments of this application provide the power consumption control method, apparatus, and system for an electric device. After the power consumption control device receives the power consumption reduction instruction, the power consumption control device can control, based on the total power consumption of the electric device and the remaining electricity of the first power source, the electric device to perform the power consumption reduction operation on the at least one target service, to reduce the power consumption of the electric device, so that the duration in which the first power source supplies power to the electric device can reach the estimated running duration. In this way, the duration in which the first power source supplies power to the electric device can be reliably ensured when the capacity of the first power source is not increased, thereby effectively reducing the costs of the first power source. In addition, the method according to embodiments of this application can ensure that the duration of lossless running of each service in the electric device can reach at least the basic running duration. Therefore, the performance of the electric device is effectively ensured.

BRIEF DESCRIPTION OF DRAWINGS

FIG. 1 is a schematic diagram of a structure of a power consumption control system for an electric device according to an embodiment of this application;

FIG. 2 is a flowchart of a power consumption control method for an electric device according to an embodiment of this application;

FIG. 3 is a flowchart of another power consumption control method for an electric device according to an embodiment of this application;

FIG. 4A and FIG. 4B are a flowchart of still another power consumption control method for an electric device according to an embodiment of this application;

DESCRIPTION OF EMBODIMENTS

Figure 5:
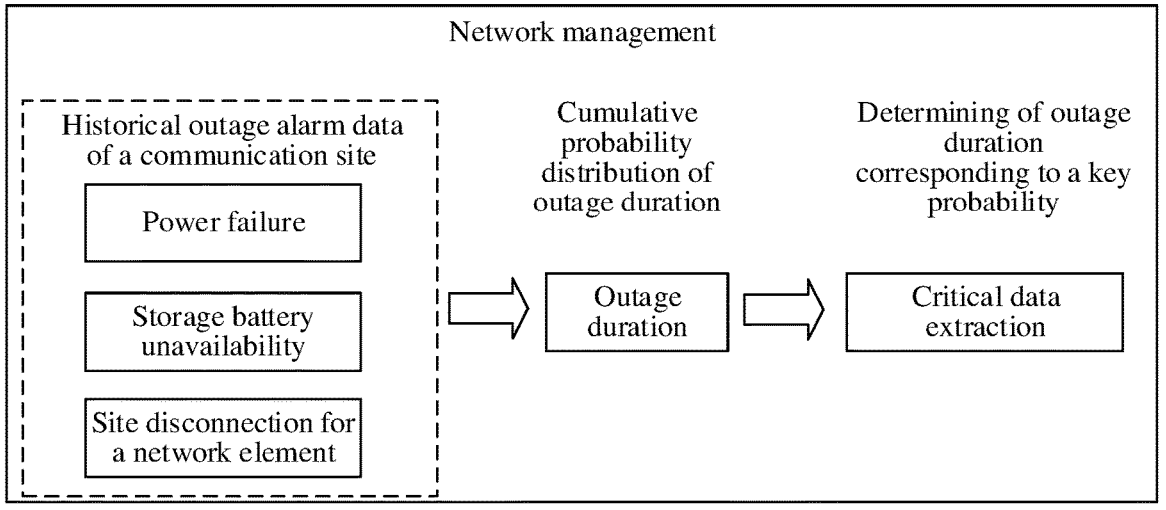
FIG. 5 is a schematic diagram of an application scenario of a power consumption control device for an electric device according to an embodiment of this application.

The following describes in detail a power consumption control method, apparatus, and system for an electric device according to embodiments of this application with reference to the accompanying drawings.

With the development of communication technologies, a capacity of an electric device in a communication site is continuously expanded. For example, a 5th generation mobile communication technology (5G) base station is added to the electric device. Consequently, power consumption of the electric device is increased. However, if a capacity of a backup power source in the communication site is not correspondingly increased, when a mains outage occurs, it is difficult for the backup power source to ensure that running duration of the electric device reaches maximum outage duration of a region in which the communication site is located.

In the conventional technology, a plurality of loads in the electric device may be classified into different priorities based on importance of running services. In addition, loads with different priorities may be connected to the backup power source through different contactors. When the mains outage occurs, the communication site may control an on-off mode of the contactor based on a voltage change or a capacity change of the backup power source, to sequentially power off the plurality of loads in the electric device in ascending order of priorities. In this way, power consumption of the electric device after the mains outage can be reduced, thereby prolonging power supply duration of the backup power source.

However, in the foregoing power consumption adjustment solution, a plurality of contactors need to be configured in the electric device, and different contactors need to be connected to loads of corresponding priorities. In this way, costs of the electric device are increased, and complexity of configuring the contactors is increased. In addition, because in the foregoing power consumption adjustment solution, the load in the electric device needs to be powered off, and a temperature difference between a load in a power-on state and a load in a power-off state is large, a risk of condensation of the electric device is increased. Consequently, performance of the electric device is affected.

FIG. 1 is a schematic diagram of a structure of a power consumption control system for an electric device according to an embodiment of this application. As shown in FIG. 1, the power consumption control system for an electric device may include a power consumption control device 110, an electric device 120, a first power source 130, and a second power source 140. The power consumption control device 110 and the electric device 120 may establish a wireless communication connection or a wired communication connection. The first power source 130 and the second power source 140 are both connected to the electric device 120 through power cables, and are configured to supply power to the electric device 120.

The first power source 130 may be a battery, for example, may be a storage battery or a lithium battery. The second power source 140 may be a mains power source, or may be a battery. In addition, the second power source 140 may be a primary power source, and the first power source 130 may be a backup power source. When the second power source 140 supplies power to the electric device 120 normally, the first power source 130 does not need to supply power to the electric device. When a power failure of the second power source 140 (for example, an outage) occurs, the first power source 130 can supply power to the electric device 120.

For example, assuming that the second power source 140 is the mains power source, as shown in FIG. 1, the second power source 140 may include a power transmission tower 1401, a power distribution cabinet 1402, and an alternating current distribution box 1403. The power transmission tower 1401 can transmit an alternating current to the alternating current distribution box 1403 through the power distribution cabinet 1402. The alternating current distribution box 1403 may convert the alternating current into a direct current and then supply power to the electric device 120.

Optionally, the power consumption control device 110 may be independent of the electric device 120. The power consumption control device 110 may be connected to a plurality of electric devices 120, and control power consumption of the plurality of electric devices 120. For example, the electric device 120 may be a communication device in a communication site, and the power consumption control device 110 may be a network management system. The network management system may be a server, or may be a server cluster including several servers, or may be a cloud computing service center.

Alternatively, the power consumption control device 110 may be integrated into the electric device 120. For example, the power consumption control device 110 may be a power management module (also referred to as a power management system) in the electric device 120. Alternatively, if the electric device 120 is a communication device in a communication site, the power consumption control device 110 may be a base station control unit in the electric device 120.

The electric device 120 may include a plurality of loads. Refer to FIG. 1. If the electric device 120 is the communication device in the communication site, the electric device 120 may include a plurality of loads such as an RRU 1201, a BBU 1202, a transmission device 1203, and a 5G base station 1204.

It should be understood that, in addition to the communication device in the communication site, the electric device 120 may be a device of another type. For example, the electric device 120 may alternatively be a device such as a vehicle (for example, an electric vehicle), a mobile terminal, or a server.

It should be further understood that the power consumption control system may not include the second power source 140. In other words, the electric device 120 may be powered by only the first power source 130. In addition, the first power source 130 may be integrated into the electric device 120.

An embodiment of this application provides a power consumption control method for an electric device. The method may be applied to a power consumption control device, for example, the power consumption control device 110 in the system shown in FIG. 1. Refer to FIG. 2. The method includes the following steps.

Step 101: Determine, based on a received power consumption reduction instruction, total power consumption of a plurality of services running in an electric device, and remaining electricity of a first power source that is configured to supply power to the electric device.

In this embodiment of this application, after the power consumption control device receives the power consumption reduction instruction, the power consumption control device may receive the total power consumption that is of the plurality of services running in the electric device and that is sent by the electric device, and determine the remaining electricity of the first power source. The remaining electricity may be sent by the electric device to the power consumption control device. Alternatively, the electric device may send a state of charge (SOC) and a state of health (SOH) of a battery of the first power source to the power consumption control device. The power consumption control device then may calculate the remaining electricity $C_0$ of the first power source based on a capacity $C$ of the first power source that is pre-stored in the power consumption control device, where the remaining electricity $C_0$ satisfies: $C_0 = C \times SOC \times SOH$.

Optionally, if the electric device is further powered by a second power source, and the first power source is a backup power source of the second power source, the power consumption reduction instruction may be an instruction that indicates a power failure of the second power source. For example, if the second power source is a mains power source, the power consumption reduction instruction may be an instruction that indicates a mains outage. If the second power source is a battery, the power consumption reduction instruction may be an instruction that indicates battery depletion.

Alternatively, if the electric device is powered by only the first power source, the power consumption reduction instruction may be an energy-saving instruction triggered by a user of the electric device, or may be an energy-saving instruction triggered when the electric device detects that the remaining electricity of the first power source is less than an electricity threshold.

Step 102: Determine, based on the total power consumption, basic electricity consumption of the plurality of services in basic running duration that starts from a time point at which the power consumption reduction instruction is received.

The basic electricity consumption is equal to a product of the total power consumption and the basic running duration. The basic running duration may be duration that is pre-stored in the power consumption control device. In addition, the basic running duration may be manually configured, or may be obtained by the power consumption control device through calculation based on historical data (for example, historical outage data). In this embodiment of this application, within the basic running duration that starts from the time point at which the power consumption reduction instruction is received, the plurality of services in the electric device can all run normally. In other words, after the power consumption reduction instruction is received, duration of lossless running of the plurality of services in the electric device can reach at least the basic running duration. Lossless running of a service means that no power consumption reduction operation is performed on the service. In other words, a running status of the service is the same before and after the power consumption reduction instruction is received.

Step 103: Control, based on the basic electricity consumption, the remaining electricity, and estimated running duration, the electric device to perform the power consumption reduction operation on at least one target service in the plurality of services, after duration that starts from the time point at which the power consumption reduction instruction is received is greater than or equal to the basic running duration.

The estimated running duration is greater than the basic running duration. A sum of the basic electricity consumption and target electricity consumption is less than or equal to the remaining electricity of the first power source. The target electricity consumption is electricity consumption of the plurality of services in a time period between the basic running duration and the estimated running duration when the power consumption reduction operation is performed on the at least one target service in the plurality of services of the electric device. In other words, the power consumption control device can control the electric device to perform the power consumption reduction operation on the at least one target service, to reduce power consumption of the electric device, so that power supply duration of the first power source can reach the estimated running duration.

Optionally, the estimated running duration may be duration that is pre-stored in the power consumption control device. In addition, the estimated running duration may be manually configured, or may be obtained by the power consumption control device through calculation based on the historical data (for example, the historical outage data).

In conclusion, this embodiment of this application provides the power consumption control method for an electric device. In the method, after the power consumption reduction instruction is received, the electric device can be controlled, based on the total power consumption of the electric device and the remaining electricity of the first power source, to perform the power consumption reduction operation on the at least one target service, to reduce the power consumption of the electric device, so that the duration in which the first power source supplies power to the electric device can reach the estimated running duration. In this way, the duration in which the first power source supplies power to the electric device can be reliably ensured when the capacity of the first power source is not increased, thereby effectively reducing costs of the first power source.

In addition, the method according to this embodiment of this application can ensure that the duration of lossless running of each service in the electric device can reach at least the basic running duration. Therefore, performance of the electric device is effectively ensured. In addition, because in the method according to this embodiment of this application, load power-off in the electric device does not need to be controlled, no contactor needs to be configured. In this way, increases in the costs and configuration complexity of the electric device can be avoided, and a risk of condensation of the electric device can be effectively reduced.

Optionally, the plurality of services running in the electric device may include at least one candidate service on which the power consumption reduction operation can be performed. Refer to FIG. 3. Step 103 may include the following steps.

Step 1031: Determine at least one target service from at least one candidate service based on the basic electricity consumption, the remaining electricity, the estimated running duration, and a power consumption gain of each candidate service, and determine target running duration.

The target running duration is less than the estimated running duration, and greater than or equal to the basic running duration. The power consumption gain refers to power consumption that can be reduced by performing the power consumption reduction operation on the candidate service. When it is ensured that the sum of the basic electricity consumption of the plurality of services running in the electric device and the target electricity consumption is less than equal to the remaining electricity of the first power source, the power consumption control device may determine the at least one target service from the at least one candidate service based on the pre-stored basic running duration, the remaining electricity of the first power source, and the power consumption gain of each candidate service, and determine the target running duration.

The at least one target service refers to a candidate service on which the power consumption reduction operation is to be performed. The target running duration indicates a moment at which the power consumption reduction operation is performed. The target electricity consumption is determined based on the total power consumption of the plurality of services in the electric device and a power consumption gain of the at least one target service. For example, assuming that the power consumption control device determines a target service, the target electricity consumption $C_P$ satisfies: $C_P=(P_0-P_1)\times(T_P-T)$, where $P_0$ represents the total power consumption, $P_1$ represents the power consumption gain of the target service, $T_P$ represents the estimated running duration, and T represents the target running duration.

Step 1032: Control the electric device to perform the power consumption reduction operation on at least one target service, when the duration that starts from the time point at which the power consumption reduction instruction is received reaches the target running duration, or when the duration that starts from the time point at which the power consumption reduction instruction is received reaches the basic running duration and the target running duration.

In this embodiment of this application, if the power consumption control device determines a target service, the power consumption control device may control the electric device to perform the power consumption reduction operation on the target service, when the duration that starts from the time point at which the power consumption reduction instruction is received reaches the target running duration.

If the power consumption control device determines a plurality of target services, in a possible implementation, the power consumption control device may control performing the power consumption reduction operation on each of the plurality of target services, when the duration that starts from the time point at which the power consumption reduction instruction is received reaches the target running duration.

If the power consumption control device determines a plurality of target services, in another possible implementation, the power consumption control device may control performing of the power consumption reduction operation on a part of the plurality of target services, when the duration that starts from the time point at which the power consumption reduction instruction is received reaches the basic running duration, and may control performing of the power consumption reduction operation on a remaining target service, when the duration that starts from the time point at which the power consumption reduction instruction is received reaches the target running duration.

For example, assuming that a quantity of target services determined by the power consumption control device is n, where n is an integer greater than 1, the power consumption control device may control performing of the power consumption reduction operation on the first n−1 target services, when the duration that starts from the time point at which the power consumption reduction instruction is received reaches the basic running duration, and may control performing of the power consumption reduction operation on an $n^{th}$ target service, when the duration that starts from the time point at which the power consumption reduction instruction is received reaches the target running duration.

An example in which the power consumption control method for an electric device is applied to the power consumption control device in the system shown in FIG. 1, the second power source in the system is a mains power source, and the first power source is a backup power source of the second power source is used below to describe the power consumption control method according to embodiments of this application. As shown in FIG. 4A and FIG. 4B, the method includes the following steps.

Step 201: Determine, based on historical outage data, cumulative probability distribution of historical outage duration of a region in which the electric device is located.

In this embodiment of this application, the power consumption control device may obtain the historical outage data of the region in which the electric device is located within a historical time period. The historical outage data may include at least an outage moment and outage duration of each outage. The historical time period may be a recent year, recent six months, or the like. After the power consumption control device obtains the historical outage data, the power consumption control device may analyze the historical outage data, and obtain the cumulative probability distribution of the historical outage duration of the region in which the electric device is located. The cumulative probability distribution may be obtained through statistics collection by using a cumulative distribution function (CDF). The cumulative probability distribution can indicate a probability that outage duration in the region in which the electric device is located is less than specific duration.

For example, assuming that the electric device is a communication device in a communication site, the power consumption control device is a network management system, and the historical time period is a recent year, the network management system may obtain historical outage alarm data that is of the recent year and that is of the region in which the communication site is located, as shown in FIG. 5. The historical outage alarm data may include data such as the historical outage data (also referred to as an outage alarm), a storage battery unavailability alarm, and a site disconnection alarm for a network element. The historical outage data may be shown in Table 1. Refer to Table 1. The historical outage data may include a plurality of pieces of outage alarm information. Each piece of outage alarm information includes an alarm identifier, an outage moment, a restoration moment, and outage duration. The outage duration is counted in time units of minutes and hours. For example, in outage alarm information with an alarm identifier of 01, an outage moment is 2020/1/27 8:21, a restoration moment is 2020/1/27 10:51, outage duration counted in the time unit of minutes is 149 minutes, and outage duration counted in the time unit of hours is 2.48 hours.

TABLE 1

| Alarm identifier | Outage moment | Restoration moment | Minutes | Hours |
|---|---|---|---|---|
| 01 | 2020 Jan. 27 8:21 | 2020 Jan. 27 10:51 | 149 | 2.48 |
| 02 | 2020 Feb. 20 13:03 | 2020 Feb. 2 14:51 | 108 | 1.80 |
| 03 | 2020 Feb. 27 16:52 | 2020 Feb. 27 17:01 | 8 | 0.13 |

TABLE 1-continued

| Alarm identifier | Outage moment | Restoration moment | Minutes | Hours |
|---|---|---|---|---|
| 04 | 2020 Mar. 2 17:44 | 2020 Mar. 2 20:45 | 180 | 3.00 |
| 05 | 2020 Mar. 10 20:45 | 2020 Mar. 10 20:50 | 6 | 0.1 |
| 06 | 2020 Mar. 21 20:45 | 2020 Mar. 21 21:34 | 48 | 0.80 |
| 07 | 2020 Apr. 1 21:34 | 2020 Apr. 1 21:36 | 2 | 0.03 |
| 08 | 2020 Apr. 27 21:36 | 2020 Apr. 27 21:41 | 4 | 0.07 |
| 09 | 2020 Apr. 27 21:51 | 2020 Apr. 27 22:06 | 14 | 0.23 |
| 10 | 2020 Jun. 7 21:56 | 2020 Jun. 7 22:00 | 3 | 0.05 |
| 11 | 2020 Jul. 27 22:00 | 2020 Jul. 27 22:04 | 3 | 0.05 |
| 12 | 2020 Aug. 11 22:04 | 2020 Aug. 11 22:06 | 1 | 0.02 |
| 13 | 2020 Sep. 3 22:06 | 2020 Sep. 3 22:09 | 3 | 0.05 |
| 14 | 2020 Oct. 7 22:10 | 2020 Oct. 7 22:11 | 1 | 0.02 |
| 15 | 2020 Oct. 27 22:11 | 2020 Oct. 27 22:14 | 2 | 0.03 |
| 16 | 2020 Nov. 4 22:14 | 2020 Nov. 4 22:17 | 2 | 0.03 |
| 17 | 2020 Dec. 5 22:17 | 2020 Dec. 5 22:26 | 9 | 0.15 |

Figure 6:
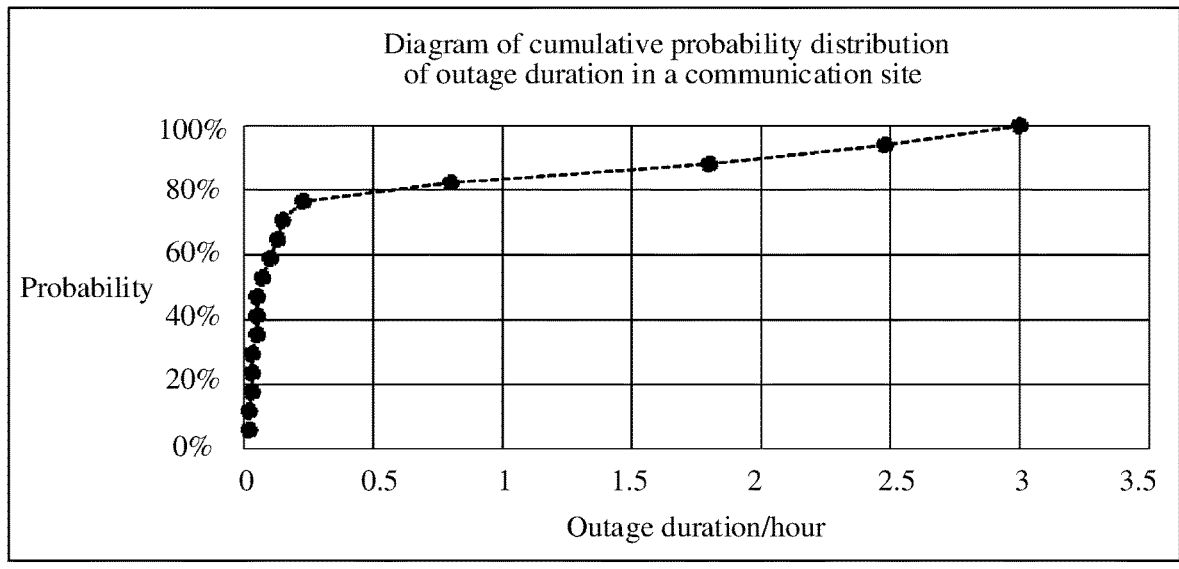
FIG. 6 is a cumulative probability distribution diagram of historical outage duration according to an embodiment of this application.

The network management system collects statistics on the historical outage data shown in Table 1 by using the CDF, and may obtain a cumulative probability distribution diagram shown in FIG. 6. It can be learned with reference to FIG. 6 that a probability that the historical outage duration is less than or equal to 0.5 hours is 7800, a probability that the historical outage duration is less than or equal to 2 hours is 9000, and a probability that the historical outage duration is less than or equal to 3 hours is 100%.

Step 202: Determine historical outage duration that corresponds to a first probability in the cumulative probability distribution as basic running duration.

A value of the first probability may range from 70% to 80%. The basic running duration refers to shortest duration required for lossless running of each service in the electric device after the power failure of the second power source (that is, after the outage). In other words, after the outage, duration of lossless running of a plurality of services in the electric device can reach at least the basic running duration.

For example, assuming that the first probability is 78%, as shown in FIG. 6, because the historical outage duration that corresponds to the first probability of 78% is determined as 0.5 hour, the network management system may determine that the basic running duration $T_0$ is 0.5 hour.

Because the value of the first probability ranges from 70% to 80%, a probability that outage duration of the region in which the electric device is located is less than or equal to the historical outage duration that corresponds to the first probability is high. Correspondingly, the historical outage duration that corresponds to the first probability is determined as the basic running duration. This can ensure that in most outage scenarios, the plurality of services running in the electric device can survive an outage in a lossless manner, to effectively ensure performance of the electric device.

Step 203: Determine a total capacity of the first power source based on historical outage duration that corresponds to a second probability in the cumulative probability distribution and total power consumption of the plurality of services.

The first power source is a backup power source configured to supply power to the electric device. The power consumption control device may determine a product of the historical outage duration that corresponds to the second probability and the total power consumption of all the services running in the electric device as the total capacity of the first power source. In other words, the total capacity C of the first power source may satisfy: $C = P_0 \times T_1$, where $P_0$ is the total power consumption of all the services running in the electric device, and $T_1$ is the historical outage duration that corresponds to the second probability.

A value of the second probability may be greater than the first probability and less than 100%. For example, a value of the second probability may range from 85% to 95%. Based on the manner of determining the total capacity of the first power source, it can be learned that, after the power failure of the second power source occurs, if all the services in the electric device run normally (in other words, a power consumption reduction operation is not performed on the electric device), power supply duration of the first power source can reach the historical outage duration that corresponds to the second probability. It can be learned that a larger value of the second probability indicates a larger total capacity of the first power source. Correspondingly, costs and reliability of the first power source are higher.

In this embodiment of this application, outage duration that corresponds to a probability value of 100% in the cumulative probability distribution may be determined as estimated running duration. In other words, maximum outage duration in the historical outage data may be determined as the estimated running duration. The estimated running duration may be used as a key performance index (KPI) of the power supply duration of the first power source. It may be understood that, if the total capacity of the first power source is configured based on the estimated running duration, it can be ensured that after the power failure of the second power source occurs, the duration of lossless running of each service in the electric device can reach the estimated running duration. However, the configuration manner significantly increases the costs of the first power source. In addition, because duration of the power failure (namely, the outage duration) of the second power source is usually less than the estimated running duration, the first power source is configured with redundancy, and electricity utilization is low.

However, in this embodiment of this application, the total capacity of the first power source that is configured based on the historical outage duration that corresponds to the second probability is small. Therefore, the costs of the first power source can be effectively reduced. In addition, when the power failure of the second power source occurs, the power consumption control device may further control the electric device to perform the power consumption reduction operation on at least one target service. In this way, power consumption of the electric device can be effectively reduced, so that the duration in which the first power source supplies power to the electric device can reach the estimated running duration, to effectively ensure reliability when the first power source supplies power. In other words, the method for configuring the total capacity of the first power source in this embodiment of this application can effectively reduce the costs of the first power source, and can also ensure the reliability when the first power source supplies power to the electric device.

For example, assuming that the value of the second probability is 90%, as shown in FIG. 6, because the historical outage duration $T_1$ that corresponds to the second probability of 90% is 2 hours, the network management system may determine that the total capacity C of the first power source is $2P_0$. Still refer to FIG. 6. Because the historical outage duration that corresponds to the probability value of 100% is 3 hours, the network management system may determine that the estimated running duration $T_P$ is 3 hours.

Figure 7:
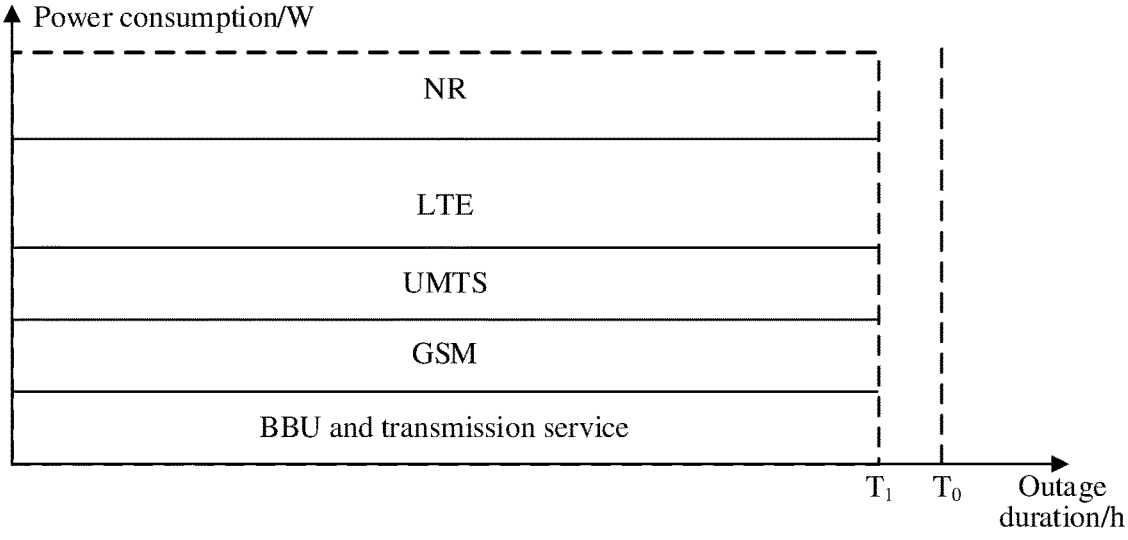
FIG. 7 is a schematic diagram of a total capacity of a first power source according to an embodiment of this application.

Refer to FIG. 7. It is assumed that the electric device is the communication device, and services running in the communication device include a new radio (NR) service, a long term evolution (LTE) service, a universal mobile telecommunications service (UMTS), a global system for mobile communications (GSM) service, a BBU service, and a transmission service. After the total capacity of the first power source is configured based on the foregoing manner, if the power failure of the second power source occurs, the first power source can drive each service in the electric device to run in a lossless manner for duration of $T_1$. $T_1$ is less than the estimated running duration $T_P$. In FIG. 7, a horizontal axis represents outage duration in a unit of hours (h), and a vertical axis represents power consumption of the electric device in a unit of watts (W).

In the solution according to this embodiment of this application, the total capacity of the first power source that supplies power to the electric device, and the KPI of the power supply duration, namely, the estimated running duration, can be determined based on the historical outage data of the region in which the electric device is located. The basic running duration of each service in the electric device may be further determined. In this way, the total capacity of the first power and the KPI of the power supply duration can be accurately configured, and the power consumption of the electric device can be accurately controlled. In other words, for different electric devices, in the method according to this embodiment of this application, different parameters (for example, the total capacity of the first power source, the estimated running duration, and the basic running duration) can be determined. Therefore, it is ensured that the determined parameters are more targeted and better meet requirements of the electric device.

Step 204: Determine, based on a received power consumption reduction instruction, the total power consumption of the plurality of services running in the electric device and remaining electricity of the first power source.

The power consumption reduction instruction may be an instruction that indicates a mains outage. After the power consumption control device receives the power consumption reduction instruction, the power consumption control device may receive the total power consumption, of the plurality of services running in the electric device, sent by the electric device, and determine the remaining electricity of the first power source. The remaining electricity may be sent by the electric device to the power consumption control device. Alternatively, the electric device may send the SOC and the SOH of the first power source to the power consumption control device. The power consumption control device then may calculate the remaining electricity $C_0$ of the first power source based on the total capacity C of the first power source that is pre-determined by the power consumption control device. The remaining electricity $C_0$ may satisfy: $C_0 = C \times SOC \times SOH$.

For example, assuming that the power consumption control device is the network management system, the power management module in the electric device may send the power consumption reduction instruction (namely, the outage alarm) to the network management system after the mains outage is detected. The power consumption reduction instruction may carry current total power consumption of the electric device and electricity information of the first power source. The electricity information may be the remaining electricity $C_0$ of the first power source, or may include the SOC and the SOH of the first power source.

Step 205: Determine, based on the total power consumption, basic electricity consumption of the plurality of services in the basic running duration that starts from a time point at which the power consumption reduction instruction is received.

After the power consumption control device determines the total power consumption of the electric device and the remaining electricity of the first power source, the power consumption control device may further determine the basic electricity consumption of plurality of services in the electric device based on the total power consumption and the basic running duration calculated in step 202. The basic electricity consumption may be equal to a product of the total power consumption and the basic running duration. In other words, the basic electricity consumption is electricity that needs to be consumed for the plurality of services in the electric device to run in a lossless manner for the basic running duration.

For example, assuming that the basic running duration $T_0$ is 0.5 hour, and the total power consumption of the plurality of services running in the electric device is $P_0$, the network management system may determine that the basic electricity consumption of the electric device is $0.5 \times P_0$.

Step 206: Sequentially monitor the first n candidate services in N candidate services in ascending order of priorities of the N candidate services until the first n candidate services and target running duration that satisfy a first target condition are detected.

In this embodiment of this application, the plurality of services running in the electric device may include N candidate services. A candidate service refers to a service on which the power consumption reduction operation can be performed. N is an integer greater than 1. In addition, N may be equal to a total quantity of the plurality of services. In other words, the plurality of services in the electric device may all be candidate services. Alternatively, N may be less than a total quantity of the plurality of services. In other words, only a part of the plurality of services are candidate services. For example, the plurality of services may be classified into a critical service and a non-critical service based on importance of the plurality of services running in the electric device, and priorities of non-critical services may be classified.

The power consumption reduction operation cannot be performed on the critical service, and may be performed on the non-critical service. Correspondingly, the N candidate services are non-critical services in the electric device. In this embodiment of this application, a service on which the power consumption reduction operation is to be performed is selected from a candidate service with low importance (namely, the non-critical service). In this way, it can be ensured that after the power consumption reduction instruction is received, a critical service in the electric device can always run in a lossless manner, to effectively ensure the performance of the electric device.

The power consumption control device may sequentially monitor the first n candidate services in the N candidate services in ascending order of the priorities of the N candidate services until the first n candidate services and the target running duration that satisfy the first target condition are detected. Because the N candidate services are sorted in ascending order of the priorities, a larger value of n indicates a higher priority of the candidate service. If the power consumption control device can detect the first n candidate services and the target running duration that satisfy the first target condition when n≤N, the following step 207 may continue to be performed. If the first n candidate services and the target running duration that satisfy the first target condition are still not detected by the power consumption control device when n=N, the following step 208 may be performed. The first target condition includes:

18

$$P_0 \times T_0 + \left(P_0 - \sum_{i=1}^{n-1} P_i\right) \times (T - T_0) + \left(P_0 - \sum_{i=1}^{n} P_i\right) \times (T_p - T) \le C_0 \times V,$$

$$\text{and } T \ge T_0.$$

$P_0$ is the total power consumption, $T_0$ is the basic running duration, $P_i$ is a power consumption gain of an $i^{th}$ candidate service, T is the target running duration, $T_p$ is the estimated running duration, $C_0$ is the remaining electricity, V is a voltage of the first power source, i is a positive integer that is not greater than n, and n is a positive integer that is not greater than N. In addition, an initial value of n is 1. In other words, the power consumption control device may start monitoring from a candidate service with a lowest priority. The power consumption gain of the candidate service is power consumption that can be reduced by performing the power consumption reduction operation on the candidate service. For example, the voltage V of the first power source may be 48 V or may be 24 V.

It can be learned from the foregoing first target condition that, the power consumption control device may control the electric device to perform the power consumption reduction operation on the first n−1 candidate services, when the duration that starts from the time point at which the power consumption reduction instruction is received reaches the basic running duration $T_0$. In addition, the electric device may be controlled to perform the power consumption reduction operation on an $n^{th}$ candidate service, when the duration that starts from the time point at which the power consumption reduction instruction is received reaches the target running duration T. In other words, the target running duration T is duration of lossless running of the $n^{th}$ candidate service.

It should be understood that when n=1, $$\sum_{i=1}^{0} P_i = 0.$$

That is, the first target condition is:

$P_0 \times T_0 + P_0 \times (T-T_0) + (P_0-P_1) \times (T_P-T) \le C_0 \times V$, and $T \ge T_0$.

For example, refer to FIG. 7. It is assumed that the electric device is the communication device, and the services running in the communication device include the NR service, the LTE service, the UMTS, the GSM service, the BBU service, and the transmission service. The GSM service, the BBU service, and the transmission service are critical services. The NR service, the LTE service, and the UMTS are non-critical services, namely, candidate services. In addition, priorities of the three candidate services are: NR<LTE<UMTS. In other words, in the three candidate services, the NR service has a lowest priority, and the UMTS has a highest priority. The network management system may first monitor the $1^{st}$ candidate service (namely, the NR service) with the lowest priority, that is, monitoring starts when n=1. During monitoring, the network management system may substitute a power consumption gain $P_1$ of the NR service into the first target condition, and determine whether the target running duration T that satisfies the first target condition can be calculated.

If the target running duration T that satisfies the first target condition is calculated by the network management system, the following step 207 may continue to be performed. If the target running duration T that satisfies the first target condition is not calculated by the network management system, n may be updated to 2. In other words, the first two candidate services (namely, the NR service and the LTE service) with the lowest priorities are monitored. During monitoring, the network management system may substitute a power consumption gain $P_1$ of the NR service and a power consumption gain $P_2$ of the LTE service into the first target condition: $P_0 \times T_0 + (P_0 - P_1) \times (T - T_0) + (P_0 - P_1 - P_2) \times (T_P - T) \leq C_0 \times V$, and $T \geq T_0$, and determine whether the target running duration T that satisfies the first target condition can be calculated.

If the target running duration T that satisfies the first target condition is calculated by the network management system, the following step 207 may continue to be performed. If the target running duration T that satisfies the first target condition is not calculated by the network management system, n may be updated to 3. In other words, the first three candidate services (namely, the NR service, the LTE service, and the UMTS) with the lowest priorities are monitored. During monitoring, the network management system may substitute a power consumption gain $P_1$ of the NR service, a power consumption gain $P_2$ of the LTE service, and a power consumption gain $P_3$ of the UMTS into the first target condition: $P_0 \times T_0 + (P_0 - P_1 - P_2) \times (T - T_0) + (P_0 - P_1 - P_2 - P_3) \times (T_P - T) \leq C_0 \times V$, and $T \geq T_0$, and determine whether the target running duration T that satisfies the first target condition can be calculated.

The power consumption control device determines, in ascending order of the priorities of the plurality of services running in the electric device, a target service on which the power consumption reduction operation is to be performed, and controls, in ascending order of the priorities, to perform the power consumption reduction operation on the at least one target service. In this way, the critical service can run in a lossless manner until the estimated running duration is reached, and a service with a higher priority in the non-critical service can run in a lossless manner for longer duration. This effectively reduces impact of the power consumption reduction operation on the service in the electric device, to ensure the performance of the electric device.

It can be learned from the foregoing first target condition that, the power consumption control device can determine, in ascending order of the priorities of the plurality of services running in the electric device, the target service on which the power consumption reduction operation is to be performed, and control, in ascending order of the priorities, to perform the power consumption reduction operation on the at least one target service. In this way, long duration of lossless running of a service with a high priority can be ensured, thereby effectively ensuring performance of the electric device.

It should be understood that, in this embodiment of this application, the plurality of services running in the communication device may be classified based on different network standards, or may be classified based on bands.

Step 207: Determine the first n candidate services as n target services, and perform step 210.

In step 206, if the power consumption control device determines the first n candidate services and the target running duration that satisfy the first target condition, the power consumption control device may determine the first n candidate services as the n target services. The n target services are the service on which the power consumption reduction operation is to be performed.

For example, assuming that the target duration that satisfies the first target condition is calculated by the network management system when n=2 in step 206, the two candidate services (namely, the NR service and the LTE service) with the lowest priorities may be determined as two target services.

Step 208: Sequentially monitor the N candidate services in ascending order of the priorities of the N candidate services and in ascending order of priorities of power consumption reduction operations of each candidate service until at least one target power consumption reduction operation of each candidate service and target running duration that satisfy a second target condition are detected In this embodiment of this application, each candidate service may have at least one power consumption reduction operation, and at least one candidate service has a plurality of power consumption reduction operations with different priorities. A priority of each power consumption reduction operation may be determined based on impact of the power consumption reduction operation on service performance. Greater impact on the service performance indicates a higher priority of the power consumption reduction operation. It may be understood that, for a scenario in which at least one candidate service has a plurality of power consumption reduction operations, in step 206, the power consumption gain of the candidate service that is used to monitor whether the first target condition is satisfied may be a power consumption gain obtained by performing a power consumption reduction operation with a lowest priority. In other words, $P_i$ in the first target condition is a power consumption gain obtained by performing the power consumption reduction operation with the lowest priority on the $i^{th}$ candidate service.

In step 206, if the first n candidate services and the target running duration that satisfy the first target condition are still not detected by the power consumption control device when n=N, the N candidate services may continue to be sequentially monitored in ascending order of the priorities of the candidate services and in ascending order of the priorities of the power consumption reduction operations of each candidate service until at least one target power consumption reduction operation of each candidate service and the target running duration that satisfy the second target condition are detected. The second target condition may include:

$$P_0 \times T_0 + (P_0 - A) \times (T - T_0) + (P_0 - B) \times (T_p - T) \leq C_0 \times V,$$

$$\text{and } T \geq T_0, \text{ where}$$

$$A = \sum_{j=1}^{m_i - 1} \sum_{i=1}^{N} (P_{i\_j} - P_{i\_j-1}) + \sum_{i=1}^{n-1} (P_{i\_j} - P_{i\_j-1}) \Big| j = m_i, \text{ and}$$

$$B = \sum_{j=1}^{m_i - 1} \sum_{i=1}^{N} (P_{i\_j} - P_{i\_j-1}) + \sum_{i=1}^{n} (P_{i\_j} - P_{i\_j-1}) \Big| j = m_i.$$

$M_i$ is a quantity of power consumption reduction operations with different priorities of the $i^{th}$ candidate service. The first $m_i$ power consumption reduction operations of the $i^{th}$ candidate service are target power consumption reduction operations of the $i^{th}$ candidate service. $m_i$ is a positive integer that is not greater than $M_i$. j is a positive integer that is not greater than $m_i$. $P_{i\_j}$ is a power consumption gain obtained by performing the $1^{st}$ power consumption reduction operation to $j^{th}$ power consumption reduction operation on the $i^{th}$ candidate service. T is the target running duration. For example, $P_{1\_2}$ represents a power consumption gain obtained by performing the $1^{st}$ power consumption reduction operation and the $2^{nd}$ power consumption reduction operation on the $1^{st}$ candidate service.

It should be understood that, in the foregoing second target condition, $P_{i\_0} = 0$, $P_{0\_j} = 0$, $$\sum_{i=1}^{0} () = 0, \text{ and } \sum_{i=1}^{0} () = 0.$$

In addition, the initial value of n is 1. In candidate services with a plurality of power consumption reduction operations, an initial value of $m_i$ that corresponds to a candidate service with a lowest priority is 2, and initial values of $m_i$ that correspond to the other candidate services are all 1. In addition, quantities of power consumption reduction operations of different candidate services may be the same or may be different. In a monitoring process, if the at least one target power consumption reduction operation and the target running duration that satisfy the second target condition are not detected by the power consumption control device, n and $m_n$ may be increased by 1, and substituted into the foregoing second target condition again for monitoring. When n is increased to N, if current $m_i < M_1$, n may be reset to 1 and the monitoring continues.

It can be learned based on the second target condition that, the power consumption control device may control the electric device to perform at least one target power consumption reduction operation on each target service, when the duration that starts from the time point at which the power consumption reduction instruction is received reaches the basic running duration. For an $i^{th}$ target service, if i=n, a target power consumption reduction operation performed on the $i^{th}$ target service is the first $m_i-1$ power consumption reduction operations in $M_i$ power consumption reduction operations with different priorities. If i≠n, a target power consumption reduction operation performed on the $i^{th}$ target service is the first $m_i$ power consumption reduction operations in $M_i$ power consumption reduction operations with different priorities. The power consumption control device controls the electric device to perform an $m_n^{th}$ power consumption reduction operation on an $n^{th}$ target service in the N target services, when the duration that starts from the time point at which the power consumption reduction instruction is received reaches the target running duration.

For example, it is assumed that the electric device is the communication device, and the communication device includes N=3 candidate services. A quantity of power consumption reduction operations and priorities of the three candidate services may be shown in Table 2. Refer to Table 2. In the three candidate services of the communication device, two candidate services (namely, the NR service and the LTE service) with lowest priorities each have four power consumption reduction operations with different priorities, that is, $M_1=M_2=4$. The priorities of the four power consumption reduction operations may be: symbol shutdown<available service transmit power reduction<channel shutdown<carrier shutdown. It can be learned based on the priority sequence that the symbol shutdown has least impact on service performance, and the carrier shutdown operation has greatest impact on the service performance. It can be further learned from Table 2 that a candidate service (namely, the UMTS) with a highest priority has two different power consumption reduction operations with different priorities, that is, $M_3=2$. The priorities of the two power consumption reduction operations may be: available service transmit power reduction carrier shutdown.

TABLE 2

| | | | Power consumption reduction operations (in ascending order of priorities) | | | |
| | | | j | | | |
| | i | Candidate services | 1 | 2 | 3 | 4 |
| --- | --- | --- | --- | --- | --- | --- |
| Priorities of services (in ascending order) | 1 | NR | Symbol shutdown | Available service transmit power reduction | Channel shutdown | Carrier shutdown |
| | 2 | LTE | Symbol shutdown | Available service transmit power reduction | Channel shutdown | Carrier shutdown |
| | 3 | UMTS | Available service transmit power reduction | Carrier shutdown | — | — |

Table 2 is used as an example. If the first n candidate services and the target running duration that satisfy the first target condition are still not detected by the network management system after n is updated to 3 in step 206, monitoring starts when n=1 and $m_1$=2. When n=1 and $m_1$=2, the network management system may substitute a power consumption gain $P_{1\_1}$ obtained by performing the symbol shutdown operation on the NR service, a power consumption gain $P_{1\_2}$ obtained by performing the symbol shutdown operation and the available service transmit power reduction operation on the NR service, a power consumption gain $P_{2\_1}$ obtained by performing the symbol shutdown operation and the available service transmit power reduction operation on the LTE service, and a power consumption gain $P_{3\_1}$ obtained by performing the available service transmit power reduction operation on the UMTS into the second target condition: $P_0 \times T_0 + (P_0 - P_{1\_1} - P_{2\_1} - P_{3\_1}) \times (T - T_0) + (P_0 - P_{2\_1} - P_{3\_1} - P_{1\_2}) \times (T_P - T) \leq C_0 \times V$, and $T \geq T_0$. Furthermore, whether the target running duration T that satisfies the second target condition can be calculated may be determined.

If the target running duration T that satisfies the second target condition is calculated by the network management system, the following step 209 may continue to be performed. If the target running duration T that satisfies the second target condition is not calculated by the network management system, n may be updated to 2, and monitoring starts when $m_2$=2. When n=2 and $m_2$=2, the network management system may substitute the power consumption gain $P_{1\_2}$ obtained by performing the symbol shutdown operation and the available service transmit power reduction operation on the NR service, the power consumption gain $P_{2\_1}$ obtained by performing the symbol shutdown operation on the LTE service, a power consumption gain $P_{2\_2}$ obtained by performing the symbol shutdown operation and the available service transmit power reduction operation on the LTE service, and the power consumption gain $P_{3\_1}$ obtained by performing the available service transmit power reduction operation on the UMTS into the second target condition: $P_0 \times T_0 + (P_0 - P_{1\_2} - P_{2\_1} - P_{3\_1}) \times (T - T_0) + (P_0 - P_{1\_2} - P_{2\_2} - P_{3\_1}) \times (T_P - T) \; C_0 \times V$, and $T \geq T_0$. Furthermore, whether the target running duration T that satisfies the second target condition can be calculated may be determined.

If the target running duration T that satisfies the second target condition is calculated by the network management system, the following step 209 may continue to be performed. If the target running duration T that satisfies the second target condition is not calculated by the network management system, n may be updated to 3, and monitoring starts when $m_3$=2. When $m_3$=2, the network management system may substitute the power consumption gain $P_{1\_2}$ obtained by performing the symbol shutdown operation and the available service transmit power reduction operation, the power consumption gain $P_{2\_2}$ obtained by performing the symbol shutdown operation and the available service transmit power reduction operation on the LTE service, the power consumption gain $P_{3\_1}$ obtained by performing the available service transmit power reduction operation on the UMTS, and a power consumption gain $P_{3\_2}$ obtained by performing the available service transmit power reduction operation and the carrier shutdown operation on the UMTS into the second target condition: $P_0 \times T_0 + (P_0 - P_{1\_2} - P_{2\_2} - P_{3\_1}) \times (T - T_0) + (P_0 - P_{1\_2} - P_{2\_2} - P_{3\_2}) \times (T_P - T) \leq C_0 \times V$, and $T \geq T_0$. Furthermore, whether the target running duration T that satisfies the second target condition can be calculated is determined.

The power consumption control device determines, in ascending order of the priorities of the power consumption reduction operations of the target services, at least one power consumption reduction operation of each target service that satisfies the second target condition, and controls, in ascending order of the priorities of the power consumption reduction operations, the electric device to perform the power consumption reduction operation on the target service. In this way, for a target service with a high priority, it can be ensured that execution of a power consumption reduction operation that greatly affects performance of the target service can be postponed, thereby effectively reducing impact of the power consumption reduction operation on the performance of the target service with the high priority.

Step 209: Determine the N candidate services as N target services, and perform step 210.

In step 208, if the power consumption control device determines at least one target power consumption reduction operation of each candidate service and the target running duration that satisfy the second target condition, the N candidate services may all be determined as the N target services. In other words, at least one power consumption reduction operation needs to be performed on each candidate service in the N candidate services.

Step 210: Determine updated total power consumption, updated remaining electricity, and updated basic electricity consumption at an interval of a monitoring periodicity before the basic running duration is reached.

It may be understood that, the total power consumption of the electric device and the remaining electricity of the first power source may be further updated, after the power consumption control device determines the target service on which the power consumption reduction operation is performed and the target duration based on step 207 or step 209. Therefore, in this embodiment of this application, before the power consumption control device controls the electric device to perform the power consumption reduction operation, the power consumption control device may further obtain the updated total power consumption and the updated remaining electricity at the interval of every monitoring periodicity, and may determine the updated basic electricity consumption based on the updated total power consumption.

After that, the power consumption control device may perform step 206 to step 209 again. In other words, the power consumption control device may re-determine at least one target service and the target running duration based on the updated basic electricity consumption, the updated remaining electricity, the estimated running duration, and the power consumption gain of each candidate service. If the at least one re-determined target service and/or target duration change/changes, the power consumption control device may control the electric device to perform the power consumption reduction operation based on at least one changed target service and/or changed target duration.

The monitoring periodicity may be a fixed value pre-stored in the power consumption control device. Duration of the monitoring periodicity is less than the basic running duration. For example, the duration of the monitoring periodicity may be 15 minutes. In this case, before the duration that starts from the time point at which the power consumption reduction instruction is received reaches the basic running duration, the power consumption control device may re-determine, at an interval of 15 minutes, the updated total power consumption of the plurality of services running in the electric device, and the updated remaining electricity of the first power source, and re-determine the updated basic electricity consumption based on the updated total power consumption. After that, the power consumption control device may perform step 206 again.

The power consumption control device periodically monitors the candidate service again based on the updated total power consumption, the updated remaining electricity, and the updated basic electricity consumption. This effectively reduces impact of service fluctuation in the electric device on the determined target service and the determined target running duration. Furthermore, it can be ensured that the target service and the target running duration are more accurately determined before the power consumption reduction operation is performed.

Step 211: Monitor whether a power consumption restoration instruction is received.

If the power consumption control device receives the power consumption restoration instruction before performing the power consumption reduction operation, the operation may be ended. In other words, the power consumption control device forbids the electric device to perform the power consumption reduction operation on at least one target service in the plurality of services, that is, power consumption adjustment of the electric device is no longer needed. If the power consumption control device does not receive the power consumption restoration instruction before performing the power consumption reduction operation, the following step 212 may continue to be performed.

The power consumption restoration instruction may be an instruction that instructs the second power source to be powered on. For example, if the second power source is a mains power source, the power consumption reduction instruction may be an instruction that instructs the mains to restore power supply. If the electric device is powered by only the first power source, the power consumption restoration instruction may be an instruction triggered by the user of the electric device, or may be an instruction triggered when the electric device detects that the remaining electricity of the first power source is greater than an electricity threshold.

If the power consumption control device receives the power consumption restoration instruction, the power consumption control device may determine that the power consumption adjustment of the electric device is no longer needed. Therefore, when the duration that starts from the time point at which the power consumption reduction instruction is received reaches the basic running duration and the target running duration, the power consumption control device may forbid the electric device to perform the power consumption reduction operation. In this way, the plurality of services in the electric device can run in a lossless manner. Flexibility of controlling, by the power consumption control device, the plurality of services of the electric device to perform the power consumption reduction operation is ensured.

Step 212: Control the electric device to perform the power consumption reduction operation on the at least one target service, when the duration that starts from the time point at which the power consumption reduction instruction is received reaches the target running duration, or when the duration that starts from the time point at which the power consumption reduction instruction is received reaches the basic running duration and the target running duration.

When the duration that starts from the time point at which the power consumption reduction instruction is received reaches the target running duration, or when the duration that starts from the time point at which the power consumption reduction instruction is received reaches the basic running duration and the target running duration, the power consumption control device may control the electric device to perform the power consumption reduction operation on at least one target service based on the at least one target service, at least one target power consumption reduction operation that may be performed on each target service, and the target running duration that are determined. For example, the power consumption control device may send a control instruction to the electric device, and the electric device may perform the power consumption reduction operation on the at least one target service based on the control instruction.

In a possible implementation, if the power consumption control device detects, in step 206, the first n candidate services and the target running duration that satisfy the first target condition, step 212 may include the following steps:

If n is equal to 1, the power consumption control device may perform the power consumption reduction operation on a $1^{st}$ target service in the n target services when the duration that starts from the time point at which the power consumption reduction instruction is received reaches the target running duration.

If n is greater than 1, the power consumption control device may perform the power consumption reduction operation on the first n−1 target service in the n target services when the duration that starts from the time point at which the power consumption reduction instruction is received reaches the basic running duration, and perform the power consumption reduction operation on an $n^{th}$ target service in the n target services when the duration that starts from the time point at which the power consumption reduction instruction is received reaches the target running duration.

It should be understood that, if any one of the foregoing target services has a plurality of power consumption reduction operations with different priorities, in this implementation, the power consumption reduction operation that the power consumption control device controls the electric device to perform is a power consumption reduction operation with a lowest priority.

Figure 8:
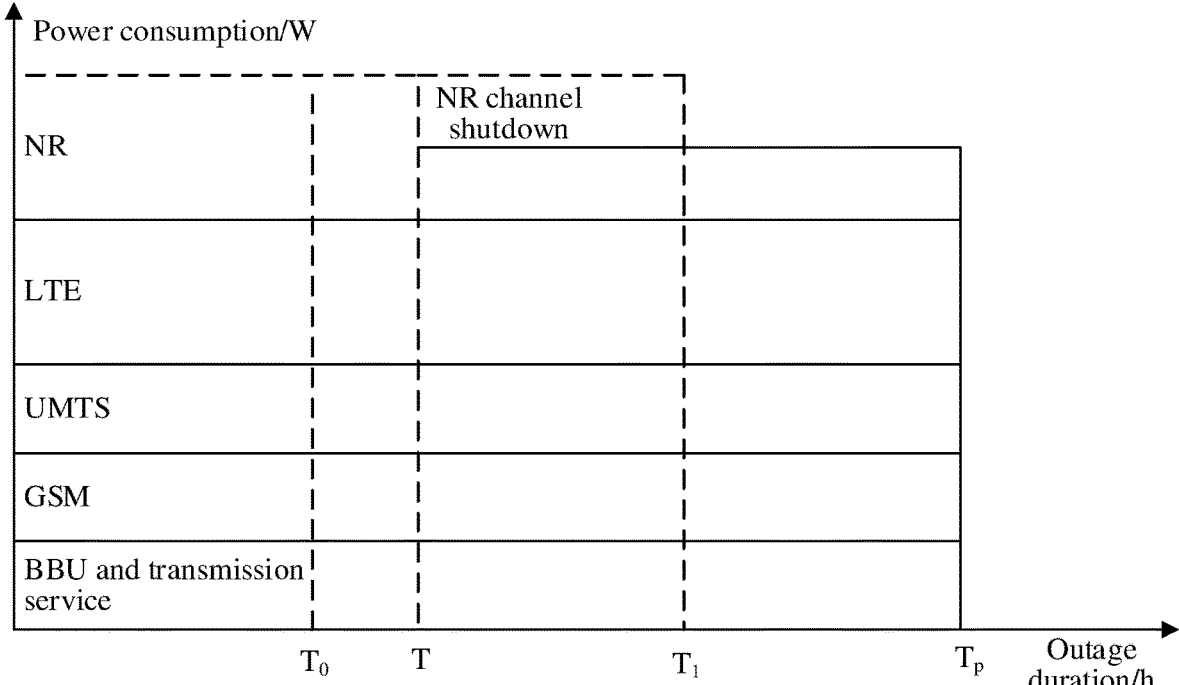
FIG. 8 is a schematic diagram of total electricity consumption of an electric device after a power consumption reduction operation is performed on a target service according to an embodiment of this application.

For example, it is assumed that the electric device is a communication device, and n=1. When the duration that starts from the time point at which the power consumption reduction instruction is received reaches a target running duration T, the network management system controls the communication device to perform the power consumption reduction operation on the $1^{st}$ target service (namely, an NR service) of the three candidate services. If the NR service has two power consumption reduction operations, including a channel shutdown operation and a carrier shutdown operation, and a priority of the channel shutdown operation is lower, the network management system may control the communication device to perform the channel shutdown operation on the NR service, as shown in FIG. 8, when the duration that starts from the time point at which the power consumption reduction instruction is received reaches the target running duration T.

Figure 9:
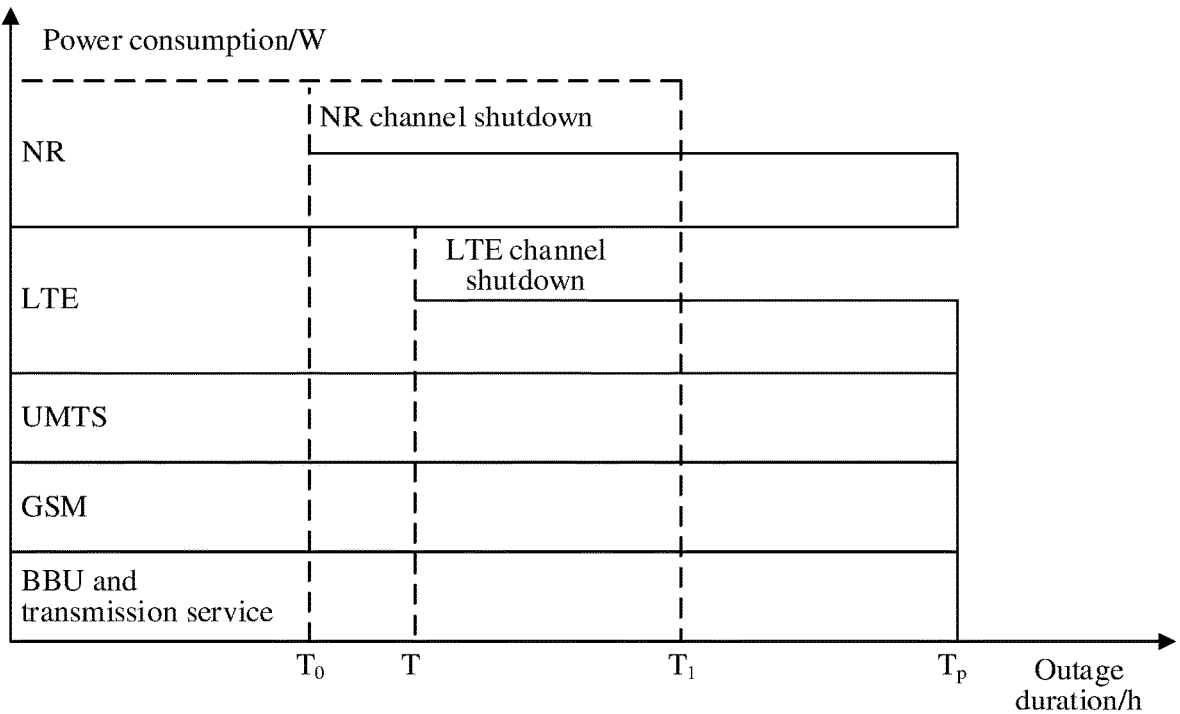
FIG. 9 is another schematic diagram of total electricity consumption of an electric device after a power consumption reduction operation is performed on a target service according to an embodiment of this application.

It is assumed that n=2, both an NR service and an LTE service have two power consumption reduction operations, including the channel shutdown operation and the carrier shutdown operation, and the priority of the channel shutdown operation is lower. As shown in FIG. 9, when the duration that starts from the time point at which the power consumption reduction instruction is received reaches the basic running duration $T_0$, the network management system may control the communication device to perform the channel shutdown operation on the 1st target service (namely, the NR service). In addition, when the duration that starts from the time point at which the power consumption reduction instruction is received reaches the target running duration T, the network management system may control the communication device to perform the channel shutdown operation on the $2^{nd}$ target service (namely, the LTE service).

Figure 10:
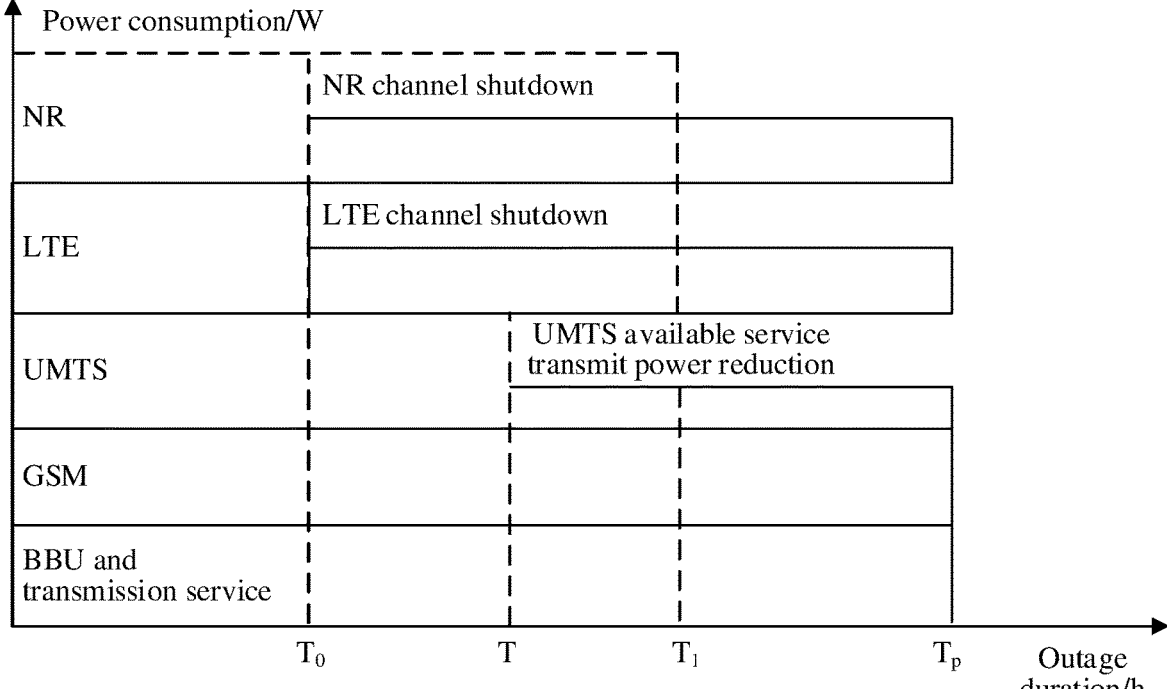
FIG. 10 is still another schematic diagram of total electricity consumption of an electric device after a power consumption reduction operation is performed on a target service according to an embodiment of this application.

It is assumed that n=3, both an NR service and an LTE service have two power consumption reduction operations, including a channel shutdown operation and a carrier shutdown operation, and a priority of the channel shutdown is lower. A UMTS has two power consumption reduction operations, including an available service transmit power reduction operation and a carrier shutdown operation, and a priority of for the available service transmit power reduction operation is lower. As shown in FIG. 10, when the duration that starts from the time point at which the power consumption reduction instruction is received reaches the basic running duration $T_0$, the network management system may control the communication device to perform the channel shutdown operation on the first two target services (namely, the NR service and the LTE service). When the duration that starts from the time point at which the power consumption reduction instruction is received reaches the target running duration T, the network management system controls the communication device to perform the available service transmit power reduction operation on the third target service (namely, the UMTS).

In another possible case, if the first n candidate services and the target running duration that satisfy the first target condition are not detected in step 206 by the power consumption control device, and at least one target power consumption reduction operation of each candidate service and the target running duration that satisfy the second target condition are detected in step 208, step 212 may include the following steps:

Step 2121: Control the electric device to perform at least one target power consumption reduction operation on each target service when the duration that starts from the time point at which the power consumption reduction instruction is received reaches the basic running duration.

For an $i^{th}$ target service, if i=n, the target power consumption reduction operation performed on the $i^{th}$ target service is the first $m_i$–1 power consumption reduction operation of $M_i$ power consumption reduction operations with different priorities. If i≠n, the target power consumption reduction operation performed on the $i^{th}$ target service is the first $m_i$ power consumption reduction operations of $M_i$ power consumption reduction operations with different priorities.

Step 2122: Control the electric device to perform an $m_n^{th}$ power consumption reduction operation on an $n^{th}$ target service in the N target services when the duration that starts from the time point at which the power consumption reduction instruction is received reaches the target running duration.

Figure 11:
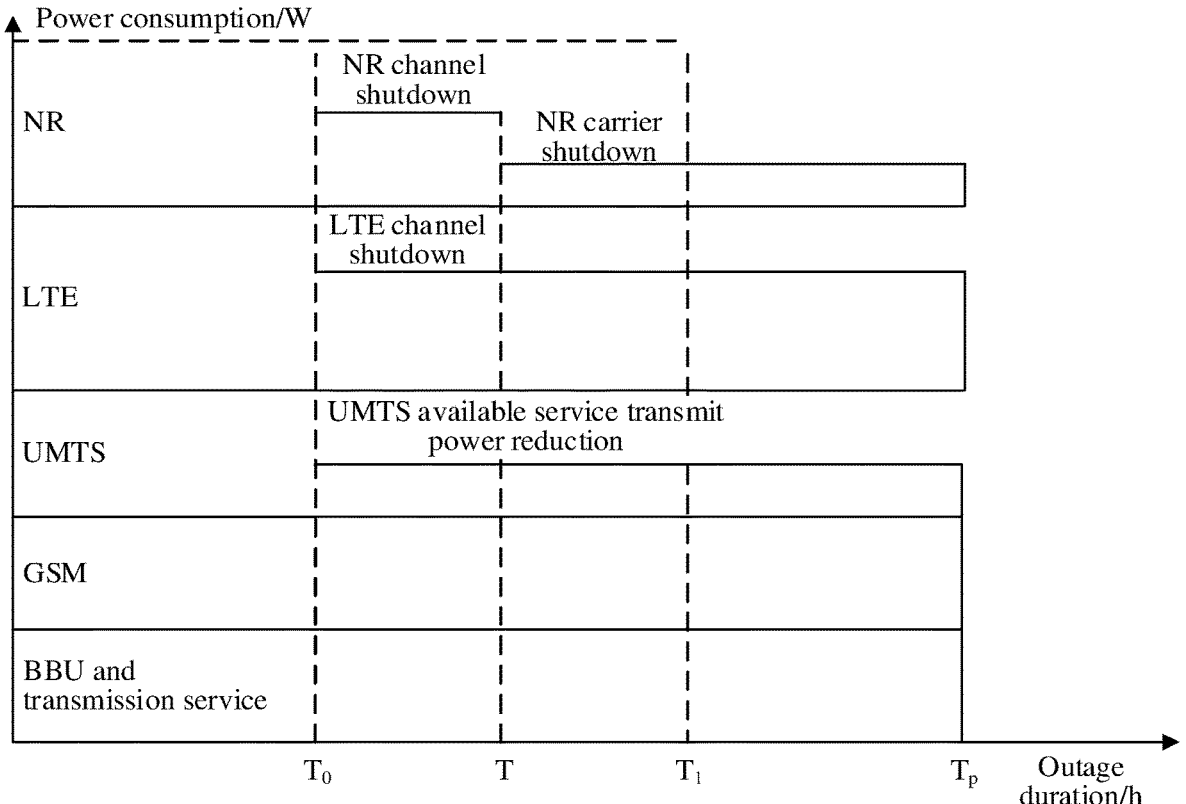
FIG. 11 is yet another schematic diagram of total electricity consumption of an electric device after a power consumption reduction operation is performed on a target service according to an embodiment of this application.

For example, it is assumed that the electric device is a communication device, and the three target services determined by the network management system include an NR service, an LTE service, and a UMTS. If n=1, $m_1$=2, and $m_2$=$m_3$=1, refer to FIG. 11. When the duration that starts from the time point at which the power consumption reduction instruction is received reaches the basic running duration $T_0$, the network management system may control the communication device to perform a channel shutdown operation on both the NR service and the LTE service, and an available service transmit power reduction operation on the UMTS. When the duration that starts from the time point at which the power consumption reduction instruction is received reaches the target running duration T, the network management system may control the communication device to perform a carrier shutdown operation on the NR service.

Figure 12:
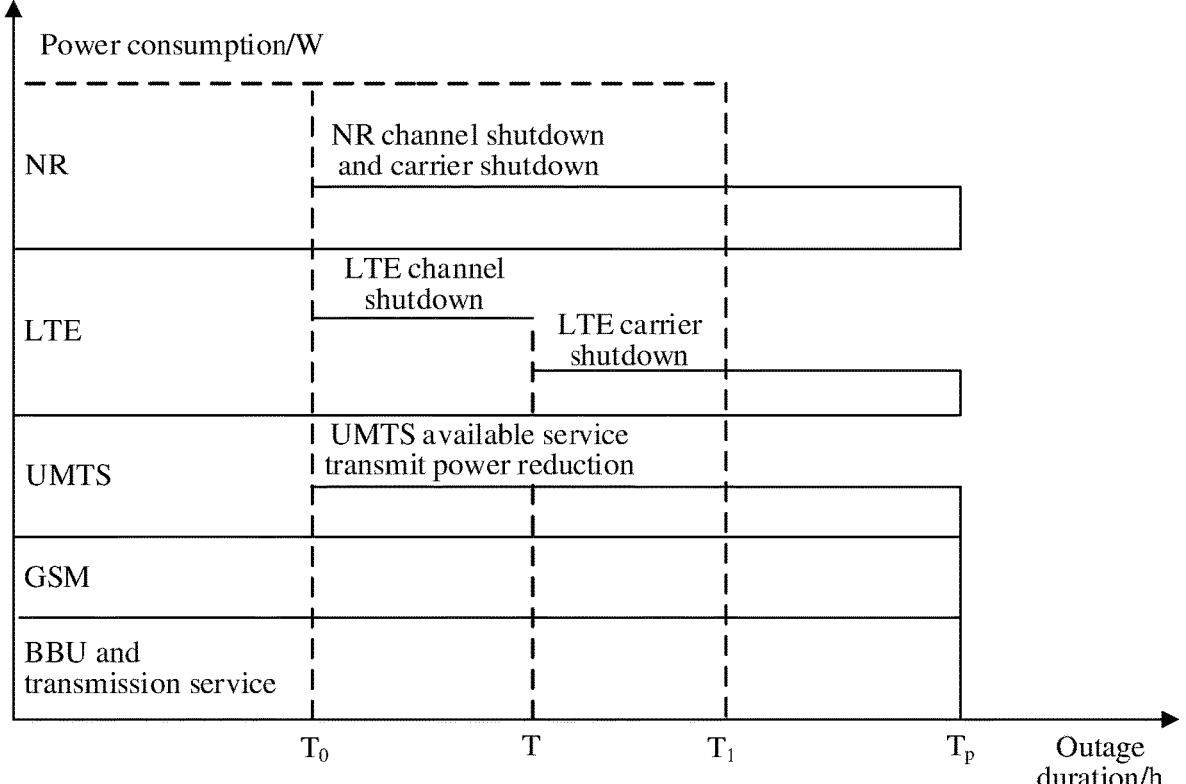
FIG. 12 is yet another schematic diagram of total electricity consumption of an electric device after a power consumption reduction operation is performed on a target service according to an embodiment of this application.

If n=2, $m_1$=$m_2$=2, and $m_3$=1, refer to FIG. 12. When the duration that starts from the time point at which the power consumption reduction instruction is received reaches the basic running duration $T_0$, the network management system may control the communication device to perform the channel shutdown operation and the carrier shutdown operation on the NR service, the channel shutdown operation on the LTE service, and the available service transmit power reduction operation on the UMTS. When the duration that starts from the time point at which the power consumption reduction instruction is received reaches the target running duration T, the network management system may control the communication device to perform the carrier shutdown operation on the LTE service.

Figure 13:
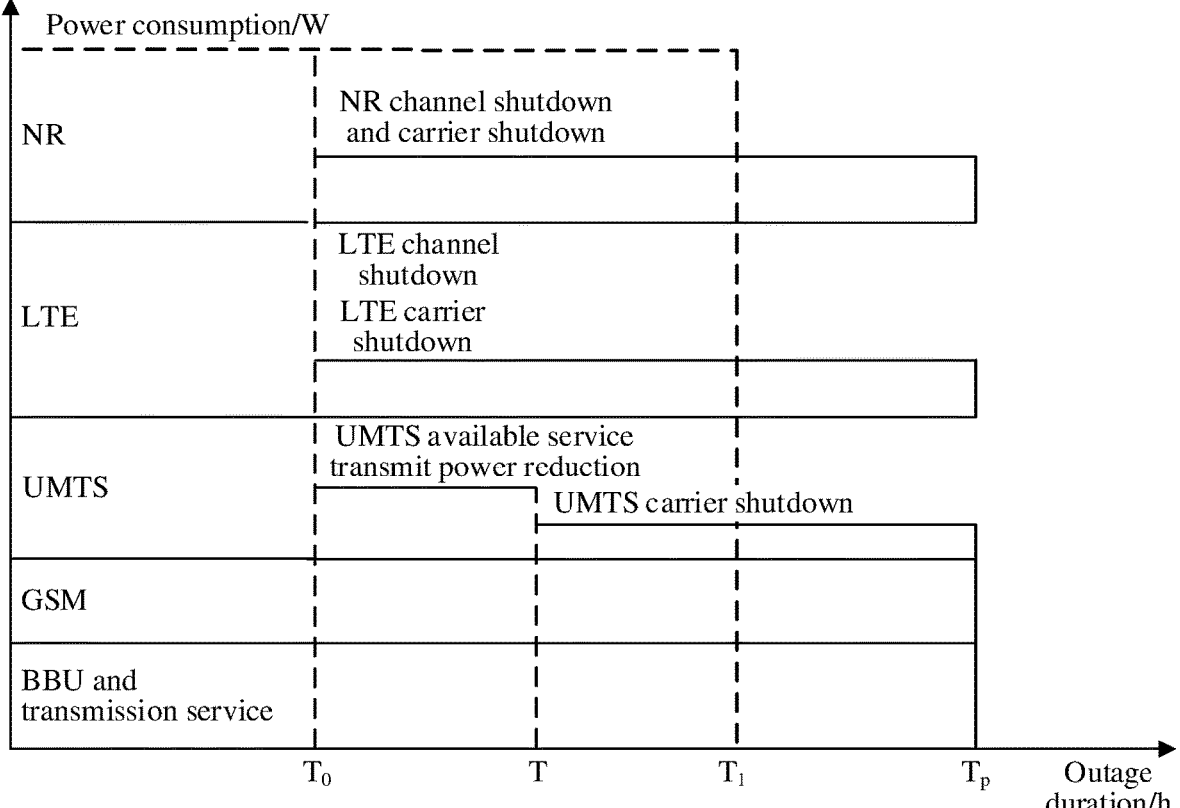
FIG. 13 is yet another schematic diagram of total electricity consumption of an electric device after a power consumption reduction operation is performed on a target service according to an embodiment of this application.

If n=3, and $m_1$=$m_2$=$m_3$=2, refer to FIG. 13. When the duration that starts from the time point at which the power consumption reduction instruction is received reaches the basic running duration $T_0$, the network management system may control the communication device to perform the channel shutdown operation and the carrier shutdown operation on both the NR service and the LTE service, and the available service transmit power reduction operation on the UMTS. When the duration that starts from the time point at which the power consumption reduction instruction is received reaches the target running duration T, the network management system may control the communication device to perform the carrier shutdown operation on the NR service, the LTE service, and the UMTS.

Figure 14:
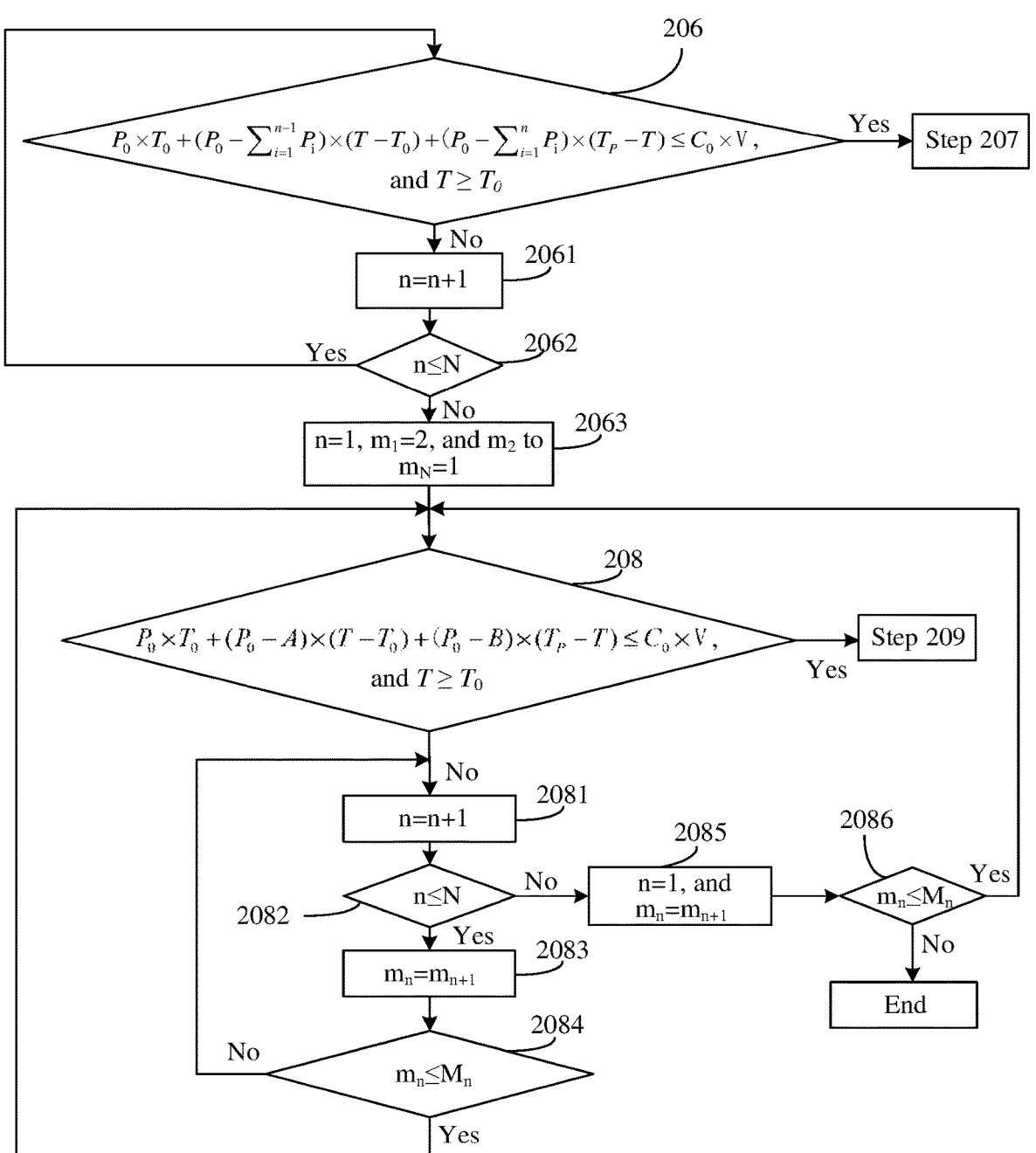
FIG. 14 is a flowchart of yet another power consumption control method for an electric device according to an embodiment of this application.

The following uses FIG. 14 as an example to describe an implementation process of step 206 and step 208. As shown in FIG. 14, if the first n candidate services and the target running duration that satisfy the first target condition are not detected in step 206 by the power consumption control device, step 2061 may be performed first, so that n is updated to n+1. Then step 2062 is performed, to monitor whether updated n is less than or equal to N. An initial value of n is 1. If n≤N, the power consumption control device may perform the foregoing step 206 again. If updated n is greater than N, the power consumption control device may perform step 2063, to reset n to 1, set $m_1$ to 2, and set $m_2$ to $m_N$ to 1. After that, the power consumption control device may continue to perform step 208.

If at least one target power consumption reduction operation of the first n candidate services and the target running duration that satisfy the second target condition are not detected in step 208 by the power consumption control device, step 2081 may be performed first, so that n is updated to n+1. Then step 2082 is performed, to monitor whether updated n is less than equal to N. If updated n is greater than N, the power consumption control device may perform step 2085, to reset n to 1 and update $m_n$ to $m_n$+1. After that, the power consumption control device may perform step 2086, to monitor whether $m_n$ is less than or equal to $M_n$. If $m_n$≤$M_n$, the power consumption control device may perform step 208 again. If updated $m_n$ is greater than $M_n$, the power consumption control device may end the operation. In step 2082, after the power consumption control device updates n to n+1, if n≤N, step 2083 may be performed, to update $m_n$ to $m_n$+1. After that, the power consumption control device may perform step 2084, to determine whether $m_n$ is less than or equal to $M_n$. If $m_n$≤$M_n$, the power consumption control device may perform step 208 again. If updated $m_n$ is greater than $M_n$, the power consumption control device may perform step 2081 again.

It may be understood that the first target condition shown in step 206 is merely used as an example. In another possible example, the first target condition may further be adjusted, provided that when the power consumption reduction operation is performed on at least one target service, a sum of the basic electricity consumption of the electric device and the target electricity consumption is less than or equal to the remaining electricity of the first power source. For example, when n is greater than 2, the first target condition may also be represented as:

$$P_0 \times T_0 + \left(P_0 - \sum_{i=1}^{n-x} P_i\right) \times (T - T_0) + \left(P_0 - \sum_{i=1}^{n} P_i\right) \times (T_p - T) \leq C_0 \times V,$$

and $T \geq T_0$.

x is an integer greater than 1 and less than n. For example, x may be 2. It can be learned based on the adjusted first target condition that, in step 212, the power consumption control device may control the electric device to perform the power consumption reduction operation on the first $n-x$ target services when the duration that starts from the time point at which the power consumption reduction instruction is received reaches the basic running duration. After that, the power consumption control device controls the electric device to perform the power consumption reduction operation on an $(n-x+1)^{th}$ to the $n^{th}$ target services when the duration that starts from the time point at which the power consumption reduction instruction is received reaches the target running duration T.

Similarly, the second target condition shown in step 208 is merely used as an example. In another possible example, the second target condition may further be adjusted. For example, when $m_i$ is greater than 2, the second target condition may also be represented as:

$$P_0 \times T_0 + \left[P_0 - \sum_{j=1}^{m_i-1} \sum_{i=1}^{N} p_{i\_j}\right] \times$$
$$(T - T_0) + \left[P_0 - \sum_{j=1}^{m_i} \sum_{i=1}^{n} p_{i\_j}\right] \times (T_p - T) \leq C_0 \times V,$$

and $T \geq T_0$. $M_i$ is the quantity of power consumption reduction operations with different priorities of an $i^{th}$ candidate service. The first $m_i$ power consumption reduction operations of the $i^{th}$ candidate service are the target power consumption reduction operations of the $i^{th}$ candidate service. $m_i$ is a positive integer that is not greater than $M_i$. j is a positive integer that is not greater than $m_i$. $p_{i\_j}$ is power consumption gain obtained by performing the $j^{th}$ power consumption reduction operation on the $i^{th}$ candidate service. T is the target running duration.

Based on the adjusted second target condition, it can be learned that in step 212, when the duration that starts from the time point at which the power consumption reduction instruction is received reaches the basic running duration, the power consumption control device may control the electric device to perform at least one target power consumption reduction operation on each target service. For the $i^{th}$ target service, if $m_i$ is equal to 1, the target power consumption reduction operation performed on the $i^{th}$ target service is the $1^{st}$ power consumption reduction operation. If $m_i$ greater than 1, the target power consumption reduction operation performed on the $i^{th}$ target service is the first $m_i-1$ power consumption reduction operations of the $M_i$ power consumption reduction operations with different priorities.

When the duration that starts from the time point at which the power consumption reduction instruction is received reaches the target running duration, the power consumption control device controls the electric device to perform a target power consumption reduction operation on a target service that corresponds to $m_i$ greater than 1 and that is in the first n target services of the N target services. For the $i^{th}$ target service, if $m_i$ is greater than 1, the target power consumption reduction operation performed on the $i^{th}$ target service is the $m_i^{th}$ power consumption reduction operation.

Figure 15:
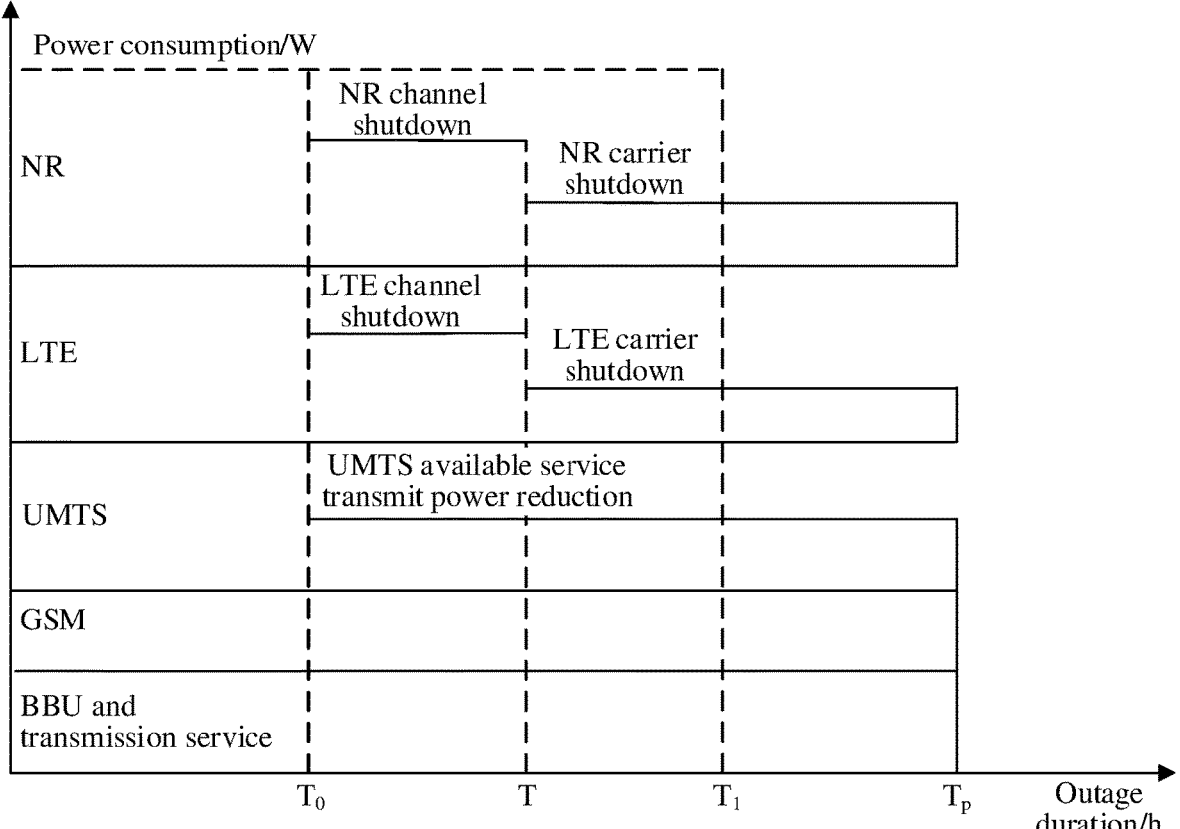
FIG. 15 is still another schematic diagram of total electricity consumption of an electric device after a power consumption reduction operation is performed on a target service according to an embodiment of this application.

For example, if n=2, $m_1=m_2=2$, and $m_3=1$, refer to FIG. 15. When the duration that starts from the time point at which the power consumption reduction instruction is received reaches the basic running duration $T_0$, the network management system may control the communication device to perform the channel shutdown operation on both the NR service and the LTE service, the channel shutdown operation on the LTE service, and the available service transmit power reduction on the UMTS. When the duration that starts from the time point at which the power consumption reduction instruction is received reaches the target running duration T, the network management system may control the communication device to perform the carrier shutdown operation on both the NR service and the LTE service.

Figure 16:
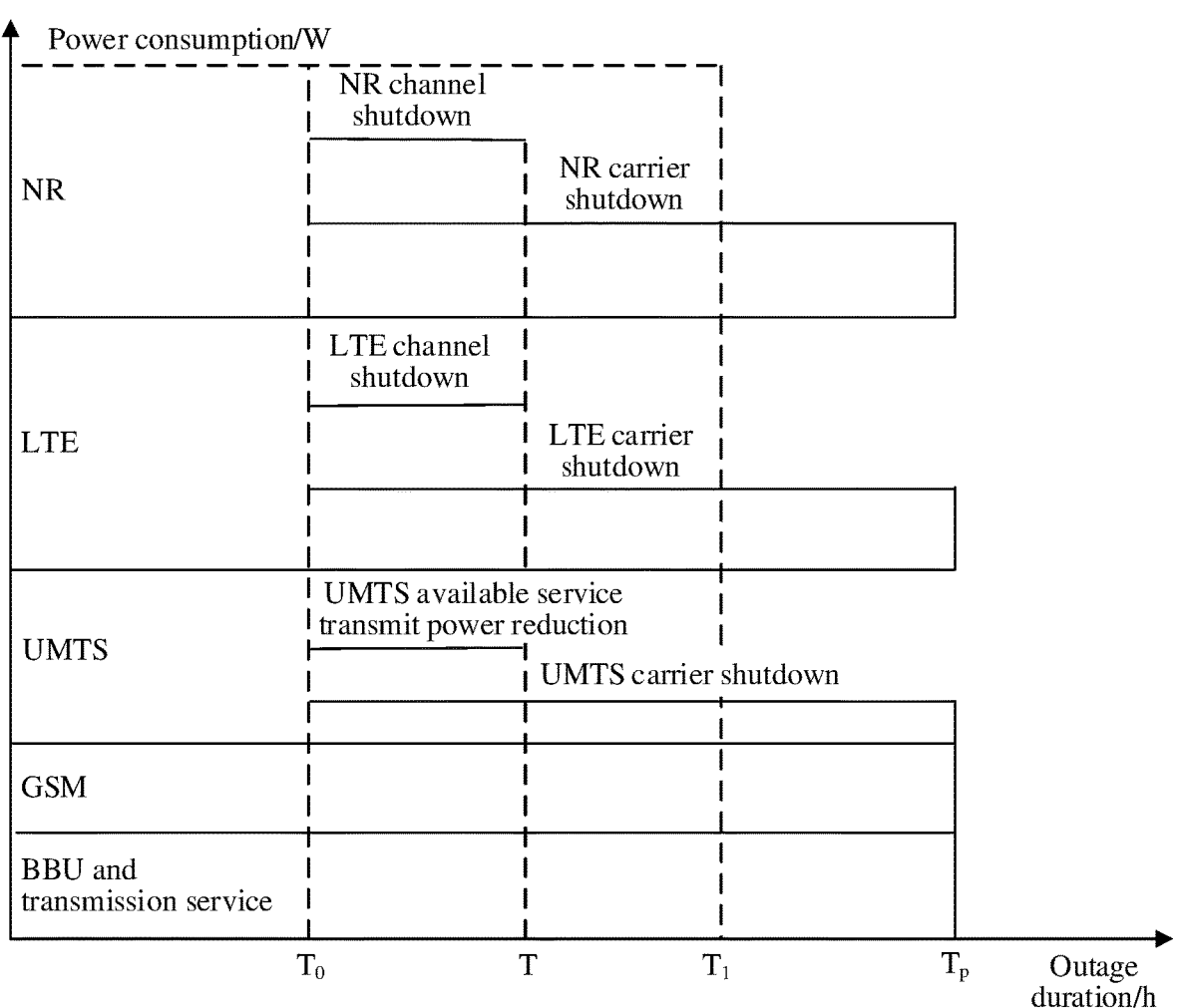
FIG. 16 is yet another schematic diagram of total electricity consumption of an electric device after a power consumption reduction operation is performed on a target service according to an embodiment of this application.

For example, if n=3, and $m_1=m_2=m_3=2$, refer to FIG. 16. When the duration that starts from the time point at which the power consumption reduction instruction is received reaches the basic running duration $T_0$, the network management system may control the communication device to perform the channel shutdown operation on the NR service and the LTE service, and the available service transmit power reduction on the UMTS. When the duration that starts from the time point at which the power consumption reduction instruction is received reaches the target running duration T, the network management system may control the communication device to perform the carrier shutdown operation on the NR service, the LTE service, and the UMTS.

It may be further understood that, in step 206 and step 208, the power consumption control device may calculate not only target duration that satisfies a target condition, but also a target SOC that satisfies the target condition. In other words, the power consumption control device may use not only the target duration, but also the SOC of the first power source as a trigger condition for performing the power consumption reduction operation.

For example, in step 206, the power consumption control device may sequentially monitor the first n candidate services of the N candidate services in ascending order of priorities of the N candidate services until n candidate services and a target SOC that satisfy a third target condition are detected. The third target condition includes:

$$\left\{T_0 + [C_0 - (P_0 \times T_0) - \alpha \times SOH \times C_0] \Big/ \left(P_0 - \sum_{i=1}^{n-1} P_i\right) + (\alpha \times SOH \times C_0) \Big/ \left[P_0 - \sum_{i=1}^{n} P_i\right]\right\} \geq T_p.$$

a is the target SOC. It can be learned based on the third target condition that, in step 212, the power consumption control device may control the electric device to perform the power consumption reduction operation on the first $n-1$ target services when the duration that starts from the time point at which the power consumption reduction instruction is received reaches the basic running duration. After that, when the SOC of the first power source decreases to a, the power consumption reduction operation is performed on the $n^{th}$ target service.

The foregoing uses an example in which the electric device is a communication device for description. It may be understood that the electric device may also be a device of another type, for example, a vehicle. In a scenario in which the electric device is a vehicle, a plurality of candidate services in the vehicle may include an in-vehicle lighting service, a temperature adjustment service, a multimedia service, and the like. Power consumption reduction operations of the in-vehicle lighting service may include: reducing brightness of lighting equipment, turning off some lighting equipment, and the like. Power consumption reduction operations of the temperature adjustment service may include: adjusting temperature of an air conditioner, reducing a wind speed of the air conditioner, and turning off the air conditioner. Power consumption reduction operations of the multimedia service may include: reducing brightness of a display, decreasing volume of a speaker, turning off the display screen, turning off some speakers, and the like.

It should be understood that a sequence of steps in the power consumption control method for an electric device according to this embodiment of this application may be properly adjusted, and steps may be correspondingly added or deleted based on a situation. For example, step 211 may be performed before step 210, or may be deleted based on a situation. Alternatively, step 201 to step 203 may be deleted based on a situation. Alternatively, step 210 may be deleted based on a situation.

In conclusion, this embodiment of this application provides the power consumption control method for an electric device. In the method, after the power consumption reduction instruction is received, the electric device can be controlled, based on the total power consumption of the electric device and the remaining electricity of the first power source, to perform the power consumption reduction operation on the at least one target service, to reduce the power consumption of the electric device, so that the duration in which the first power source supplies power to the electric device can reach the estimated running duration. In this way, the duration in which the first power source supplies power to the electric device can be reliably ensured when the capacity of the first power source is not increased, thereby effectively reducing the costs of the first power source. In addition, the method according to embodiments of this application can ensure that the duration of lossless running of each service in the electric device can reach at least the basic running duration. Therefore, the performance of the electric device is effectively ensured. In addition, because in the method according to this embodiment of this application, load power-off in the electric device does not need to be controlled, no contactor needs to be configured. In this way, increases in costs and configuration complexity of the electric device can be avoided, and the risk of condensation of the electric device can be effectively reduced.

Figure 17:
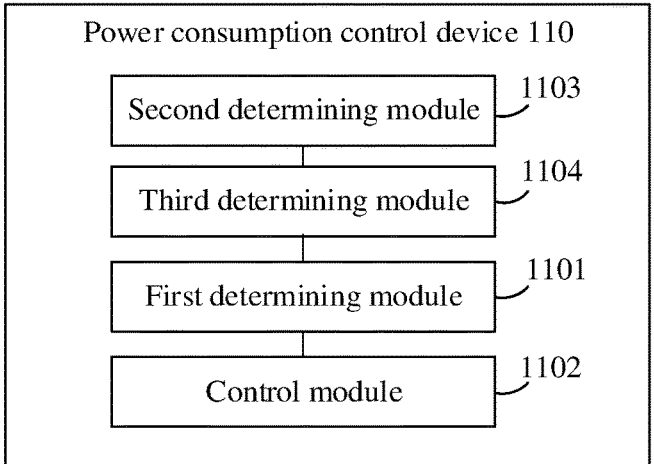
FIG. 17 is a schematic diagram of a structure of a power consumption control device for an electric device according to an embodiment of this application.

An embodiment of this application further provides a power consumption control device for an electric device. The power consumption control device may be used in a power consumption control system of an electric device, for example, may be used in the power consumption control system shown in FIG. 1. In addition, the power consumption control device may be configured to implement the power consumption control method according to the method embodiments. As shown in FIG. 17, the power consumption control device 110 includes the following modules.

A first determining module 1101 is configured to determine, based on a received power consumption reduction instruction, total power consumption of a plurality of services running in the electric device, and remaining electricity of a first power source that is configured to supply power to the electric device.

For a function implementation of the first determining module 1101, refer to related descriptions of step 101 or step 204 in the foregoing method embodiments.

The first determining module 1101 is further configured to determine, based on the total power consumption, basic electricity consumption of the plurality of services in basic running duration that starts from a time point at which the power consumption reduction instruction is received.

For a function implementation of the first determining module 1101, further refer to related descriptions of step 102 or step 205 in the foregoing method embodiments.

A control module 1102 is configured to control, based on the basic electricity consumption, the remaining electricity, and estimated running duration, the electric device to perform a power consumption reduction operation on at least one target service in the plurality of services, after duration that starts from the time point at which the power consumption reduction instruction is received is greater than or equal to the basic running duration.

The estimated running duration is greater than the basic running duration. A sum of the basic electricity consumption and target electricity consumption is less than or equal to the remaining electricity. The target electricity consumption is electricity consumption of the plurality of services in a time period between the basic running duration and the estimated running duration when the power consumption reduction operation is performed on the at least one target service in the plurality of services.

For a function implementation of the control module 1102, refer to related descriptions of step 103 or step 212 in the foregoing method embodiments.

Figure 18:
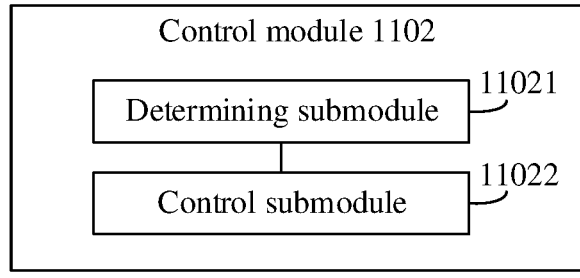
FIG. 18 is a schematic diagram of a structure of a control module in a power consumption control device according to an embodiment of this application.

Optionally, the plurality of services include at least one candidate service on which the power consumption reduction operation can be performed. As shown in FIG. 18, the control module 1102 may include the following modules.

A determining submodule 11021 is configured to determine at least one target service from the at least one candidate service based on the basic electricity consumption, the remaining electricity, the estimated running duration, and a power consumption gain of each candidate service, and determine target running duration. The target running duration is less than the estimated running duration, and greater than or equal to the basic running duration. The power consumption gain refers to power consumption that can be reduced by performing the power consumption reduction operation on the candidate service, and the target electricity consumption is determined based on the total power consumption and the power consumption gain of the at least one target service.

For a function implementation of the determining submodule 11021, refer to related descriptions of step 1031 in the foregoing method embodiment.

A control submodule 11022 is configured to control the electric device to perform the power consumption reduction operation on the at least one target service, when the duration that starts from the time point at which the power consumption reduction instruction is received reaches the target running duration, or when the duration that starts from the time point at which the power consumption reduction instruction is received reaches the basic running duration and the target running duration.

For a function implementation of the control submodule 11022, refer to related descriptions of step 1032 in the foregoing method embodiment.

Optionally, the plurality of services include N candidate services, where N is an integer greater than 1. The determining submodule 11021 is configured to: sequentially monitor the first n candidate services in the N candidate services in ascending order of priorities of the N candidate services until the first n candidate services and target running duration that satisfy a first target condition are detected, where the first target condition includes:

$$P_0 \times T_0 + \left(P_0 - \sum_{i=1}^{n-1} P_i\right) \times (T - T_0) + \left(P_0 - \sum_{i=1}^{n} P_i\right) \times (T_p - T) \le C_0 \times V,$$

and $T \ge T_0$, where $P_0$ is the total power consumption, $T_0$ is the basic running duration, $P_i$ is a power consumption gain of an $i^{th}$ candidate service, $T$ is the target running duration, $T_p$ is the estimated running duration, $C_0$ is the remaining electricity, $V$ is a voltage of the first power source, i is a positive integer that is not greater than n, and n is a positive integer that is not greater than N; and determine the first n candidate services as n target services.

For a function implementation of the determining submodule 11021, further refer to related descriptions of step 206 and step 207 in the foregoing method embodiment.

The control submodule 11022 is configured to: if n is equal to 1, control the electric device to perform the power consumption reduction operation on a $1^{st}$ target service in the n target services when the duration that starts from the time point at which the power consumption reduction instruction is received reaches the target running duration; or if n is greater than 1, perform the power consumption reduction operation on the first n−1 target services in the n target services when the duration that starts from the time point at which the power consumption reduction instruction is received reaches the basic running duration, and control the electric device to perform the power consumption reduction operation on an $n^{th}$ target service in the n target services, when the duration that starts from the time point at which the power consumption reduction instruction is received reaches the target running duration.

For a function implementation of the control submodule 11022, further refer to related descriptions of step 212 in the foregoing method embodiment.

Optionally, at least one candidate service in the N candidate services has a plurality of power consumption reduction operations with different priorities, and $P_i$ in the first target condition is a power consumption gain obtained by performing a power consumption reduction operation with a lowest priority on the $i^{th}$ candidate service. The determining submodule 11021 may further be configured to:

if the first n candidate services and the target running duration that satisfy the first target condition are not detected, sequentially monitor the N candidate services in ascending order of the priorities of the N candidate services and in ascending order of priorities of power consumption reduction operations of each candidate service until at least one target power consumption reduction operation of each candidate service and target running duration that satisfy a second target condition are detected, where the second target condition includes:

$$P_0 \times T_0 + (P_0 - A) \times (T - T_0) + (P_0 - B) \times (T_p - T) \le C_0 \times V,$$

and $T \ge T_0$, where $$A = \sum_{j=1}^{m_i-1} \sum_{i=1}^{N} (P_{i\_j} - P_{i\_j-1}) + \sum_{i=1}^{n-1} (P_{i\_j} - P_{i\_j-1}) \bigg| j = m_i, \text{ and}$$

$$B = \sum_{j=1}^{m_i-1} \sum_{i=1}^{N} (P_{i\_j} - P_{i\_j-1}) + \sum_{i=1}^{n} (P_{i\_j} - P_{i\_j-1}) \bigg| j = m_i.$$

$M_i$ is a quantity of power consumption reduction operations with different priorities of the $i^{th}$ candidate service, the first $m_i$ power consumption reduction operations of the $i^{th}$ candidate service are target power consumption reduction operations of the $i^{th}$ candidate service, $m_i$ is a positive integer that is not greater than $M_i$, j is a positive integer that is not greater than $m_i$, $P_{i\_j}$ is a power consumption gain obtained by performing the $1^{st}$ power consumption reduction operation to $j^{th}$ power consumption reduction operation on the $i^{th}$ candidate service, and T is target running duration. The determining submodule may further be configured to determine the N candidate services as N target services.

For a function implementation of the determining submodule 11021, further refer to related descriptions of step 208 and step 209 in the foregoing method embodiment.

The control submodule 11022 is configured to:

control the electric device to perform at least one target power consumption reduction operation on each target service when the duration that starts from the time point at which the power consumption reduction instruction is received reaches the basic running duration. For an $i^{th}$ target service, if i=n, a target power consumption reduction operation performed on the $i^{th}$ target service is the first $m_i-1$ power consumption reduction operations in $M_i$ power consumption reduction operations with different priorities; or if i≠n, a target power consumption reduction operation performed on the $i^{th}$ target service is the first $m_i$ power consumption reduction operations in $M_i$ power consumption reduction operations with different priorities; and control the electric device to perform an $m_n^{th}$ power consumption reduction operation on an $n^{th}$ target service in the N target services, when the duration that starts from the time point at which the power consumption reduction instruction is received reaches the target running duration.

Optionally, the first determining module 1101 is further configured to determine updated total power consumption, updated remaining electricity, and updated basic electricity consumption at an interval of a monitoring periodicity before the basic running duration is reached.

For a function implementation of the first determining module 1101, refer to related descriptions of step 210 in the foregoing method embodiment.

The control module 1102 is further configured to: re-perform, based on the updated basic electricity consumption, the updated remaining electricity, the estimated running duration, and the power consumption gain of each candidate service, the operation of determining at least one target service and determining target running duration; and control, if the at least one re-determined target service and/or the re-determined target duration change/changes, the electric device to perform the power consumption reduction operation based on at least one changed target service and/or changed target duration.

Optionally, the control module 1102 is further configured to: if a power consumption restoration instruction is received, forbid the electric device to perform the power consumption reduction operation on the at least one target service in the plurality of services. For a function implementation of the control module 1102, refer to related descriptions of step 211 in the foregoing method embodiment.

Optionally, the electric device is further connected to a second power source. The first power source is a backup power source of the second power source. The power consumption reduction instruction is an instruction that indicates a power failure of the second power source.

Optionally, the second power source is a mains power source. As shown in FIG. 17, the power consumption control device may further include:

a second determining module 1103, configured to determine, based on historical outage data, cumulative probability distribution in historical outage duration of a region in which the electric device is located; and determine historical outage duration that corresponds to a first probability in the cumulative probability distribution as the basic running duration, where a value of the first probability ranges from 70% to 80%.

For a function implementation of the second determining module 1103, refer to related descriptions of step 201 and step 202 in the foregoing method embodiment.

Optionally, still refer to FIG. 17. The power consumption control device 110 may further include:

a third determining module 1104, configured to determine a total capacity of the first power source based on historical outage duration that corresponds to a second probability in the cumulative probability distribution and the total power consumption of the plurality of services. A value of the second probability ranges from 85% to 95%. For a function implementation of the third determining module 1104, refer to related descriptions of step 203 in the foregoing method embodiment.

In conclusion, this embodiment of this application provides a power consumption control device for an electric device. The power consumption control device can control, based on the total power consumption of the electric device and the remaining electricity of the first power source, the electric device to perform the power consumption reduction operation on the at least one target service, to reduce the power consumption of the electric device, so that the duration in which the first power source supplies power to the electric device can reach the estimated running duration. In this way, the duration in which the first power source supplies power to the electric device can be reliably ensured when the capacity of the first power source is not increased, thereby effectively reducing the costs of the first power source. In addition, the device according to this embodiment of this application can ensure that the duration of lossless running of each service in the electric device can reach at least the basic running duration. Therefore, the performance of the electric device is effectively ensured. In addition, because the device according to this embodiment of this application does not need to control load power-off in the electric device, no contactor needs to be configured. In this way, increases in costs and configuration complexity of the electric device can be avoided, and a risk of condensation of the electric device can be effectively reduced.

Figure 19:
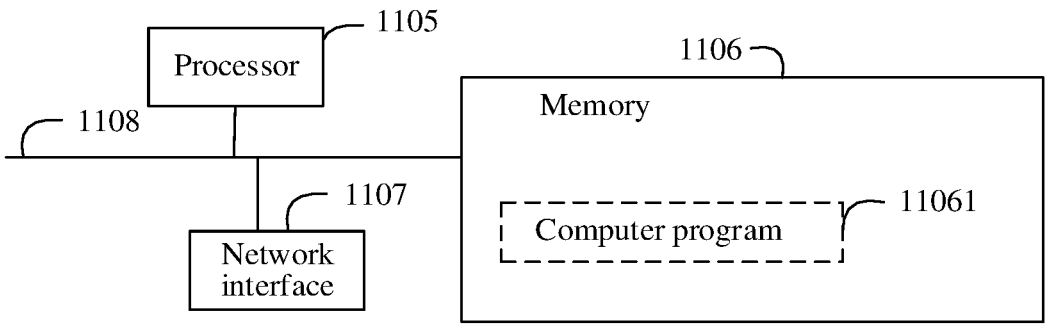
FIG. 19 is a schematic diagram of a structure of another power consumption control device according to an embodiment of this application.

FIG. 19 is a schematic diagram of a structure of another power consumption control device according to this embodiment of this application. The power consumption control device may be configured to implement the power consumption control method for an electric device according to the method embodiment. As shown in FIG. 19, the power consumption control device may include: a processor 1105, a memory 1106, a network interface 1107, and a bus 1108.

The bus 1108 is configured to connect the processor 1105, the memory 1106, and the network interface 1107. A communication connection to another device may be implemented through the network interface 1107 (which may be wired or wireless). The memory 1106 stores a computer program 11061, and the computer program 11061 is used to implement various application functions.

It should be understood that, in embodiments of this application, the processor 1105 may be a CPU, or the processor 1105 may be another general-purpose processor, a digital signal processor (DSP), an application-specific integrated circuit (ASIC), a field-programmable gate array (FPGA), a GPU or another programmable logic device, a discrete gate or a transistor logic device, a discrete hardware component, or the like. The general-purpose processor may be a microprocessor or any conventional processor or the like.

The memory 1106 may be a volatile memory or a non-volatile memory, or may include both a volatile memory and a non-volatile memory. The non-volatile memory may be a read-only memory (ROM), a programmable read-only memory (programmable ROM, PROM), an erasable programmable read-only memory (erasable PROM, EPROM), an electrically erasable programmable read-only memory (electrically EPROM, EEPROM), or a flash memory. The volatile memory may be a random access memory (RAM), used as an external cache. Through an example but not limitative description, many forms of RAMs may be used, for example, a static random access memory (static RAM, SRAM), a dynamic random access memory (DRAM), a synchronous dynamic random access memory (synchronous DRAM, SDRAM), a double data rate synchronous dynamic random access memory (double data rate SDRAM, DDR SDRAM), an enhanced synchronous dynamic random access memory (enhanced SDRAM, ESDRAM), a synchlink dynamic random access memory (synchlink DRAM, SLDRAM), and a direct rambus random access memory (direct rambus RAM, DR RAM).

In addition to a data bus, the bus 1108 may further include a power bus, a control bus, a status signal bus, and the like. However, for clear description, various buses in the figures are marked as the bus 1108.

The processor 1105 is configured to execute the computer program stored in the memory 1106. The processor 1105 executes the computer program 11061 to implement the power consumption control method for an electric device according to the foregoing method embodiments, for example, the method shown in FIG. 2, FIG. 3, or FIG. 4A and FIG. 4B.

An embodiment of this application further provides another power consumption control device. The power consumption control device may include a programmable logic circuit and/or a program instruction, and the power consumption control device may be configured to implement the power consumption control method for an electric device according to the foregoing method embodiments, for example, the method shown in FIG. 2, FIG. 3, or FIG. 4A and FIG. 4B.

An embodiment of this application further provides a computer-readable storage medium. The computer-readable storage medium stores a computer program, and the computer program is executed by a processor, to implement the power consumption control method for an electric device according to the foregoing method embodiments, for example, the method shown in FIG. 2, FIG. 3, or FIG. 4A and FIG. 4B.

An embodiment of this application further provides a computer program product including instructions. When the computer program product runs on a computer, the computer executes the power consumption control method for an electric device according to the foregoing method embodiments, for example, the method shown in FIG. 2, FIG. 3, or FIG. 4A and FIG. 4B.

An embodiment of this application further provides a power consumption control system for an electric device. As shown in FIG. 1, the system includes: a power consumption control device 110, an electric device 120, and a first power source 130 configured to supply power to the electric device 120. The power consumption control device 110 may be the power consumption control device shown in FIG. 17 or FIG. 19 according to the foregoing embodiment, and the power consumption control device 110 may be configured to implement the power consumption control method for an electric device according to the foregoing method embodiments.

Still refer to FIG. 1. The system may further include a second power source 140. The first power source 130 is a backup power source of the second power source 140.

All or some of the foregoing embodiments may be implemented using software, hardware, firmware, or any combination thereof. When software is used to implement embodiments, the foregoing embodiments may be implemented completely or partially in a form of a computer program product. The computer program product includes one or more computer instructions. When the computer program instructions are loaded or executed on a computer, all or some of the processes or the functions according to embodiments of this application are generated. The computer may be a general-purpose computer, a dedicated computer, a computer network, or other programmable apparatuses. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line (DSL)) or wireless (for example, infrared, radio, and microwave, or the like) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, a DVD), or a semiconductor medium. The semiconductor medium may be a solid-state drive (SSD).

In this application, the term "at least one" means one or more, and the term "a plurality of" in this application means two or more. For example, a plurality of services means two or more services. The "and/or" mentioned in this specification indicates that three relationships may exist. For example, A and/or B may indicate: the following three cases: Only A exists, both A and B exist, and only B exists. The character "/" generally indicates an "or" relationship between the associated objects.

The foregoing descriptions are merely optional implementations of this application, but the protection scope of this application is not limited thereto. Any equivalent modification or replacement readily figured out by a person skilled in the art within the technical scope disclosed in this application shall fall within the protection scope of this application. Therefore, the protection scope of this application shall be subject to the protection scope of the claims.

What is claimed is:

1. A power consumption control method, comprising:
determining, based on a received power consumption reduction instruction, total power consumption of a plurality of services running in an electric device and remaining electricity of a first power source that is configured to supply power to the electric device;
determining, based on the total power consumption, basic electricity consumption of the plurality of services in a basic running duration that starts from a time point at which the power consumption reduction instruction is received; and
controlling, based on the basic electricity consumption, the remaining electricity and an estimated running duration, the electric device to perform a power consumption reduction operation on at least one target service in the plurality of services, after duration that starts from the time point at which the power consumption reduction instruction is received is greater than or equal to the basic running duration, wherein
the estimated running duration is greater than the basic running duration, a sum of the basic electricity consumption and target electricity consumption is less than or equal to the remaining electricity, and the target electricity consumption is electricity consumption of the plurality of services in a time period between the basic running duration and the estimated running duration when the power consumption reduction operation is performed on the at least one target service in the plurality of services.

2. The method of claim 1, wherein the plurality of services comprise at least one candidate service on which the power consumption reduction operation can be performed; and the controlling the electric device to perform the power consumption reduction operation comprises:
determining at least one target service from the at least one candidate service based on the basic electricity consumption, the remaining electricity, the estimated running duration, and a power consumption gain of each candidate service, wherein the power consumption gain refers to power consumption that can be reduced by performing the power consumption reduction operation on the each candidate service;
determining a target running duration that is less than the estimated running duration and greater than or equal to the basic running duration; and
controlling the electric device to perform the power consumption reduction operation on the at least one target service, when the duration that starts from the time point at which the power consumption reduction instruction is received reaches the target running duration, or when the duration that starts from the time point at which the power consumption reduction instruction is received reaches the basic running duration and the target running duration, wherein the target electricity consumption is determined based on the total power consumption and the power consumption gain of the at least one target service.

3. The method of claim 2, wherein the plurality of services comprise N candidate services, and N is an integer greater than 1; and the determining at least one target service from the at least one candidate service comprises:
sequentially monitoring the first n candidate services in the N candidate services in ascending order of priorities of the N candidate services until the first n candidate services and target running duration that satisfy a first target condition are detected, wherein the first target condition comprises:

$$P_0 \times T_0 + \left(P_0 - \sum_{i=1}^{n-1} P_i\right) \times (T - T_0) + \left(P_0 - \sum_{i=1}^{n} P_i\right) \times (T_p - T) \le C_0 \times V,$$

and $T \ge T_0$, wherein $P_0$ is the total power consumption, $T_0$ is the basic running duration, $P_1$ is a power consumption gain of an $i^{th}$ candidate service, T is the target running duration, $T_p$ is the estimated running duration, $C_0$ is the remaining electricity, V is a voltage of the first power source, i is a positive integer that is not greater than n, and n is a positive integer that is not greater than N; and determining the first n candidate services as n target services; and the controlling the electric device to perform the power consumption reduction operation on the at least one target service, when the duration that starts from the time point at which the power consumption reduction instruction is received reaches the target running duration, or when the duration that starts from the time point at which the power consumption reduction instruction is received reaches the basic running duration and the target running duration comprises:

if n is equal to 1, controlling the electric device to perform the power consumption reduction operation on a $1^{st}$ target service in the n target services when the duration that starts from the time point at which the power consumption reduction instruction is received reaches the target running duration; or if n is greater than 1, performing the power consumption reduction operation on the first n−1 target services in the n target services when the duration that starts from the time point at which the power consumption reduction instruction is received reaches the basic running duration, and controlling the electric device to perform the power consumption reduction operation on an $n^{th}$ target service in the n target services, when the duration that starts from the time point at which the power consumption reduction instruction is received reaches the target running duration.

4. The method of claim 3, wherein at least one candidate service in the N candidate services has a plurality of power consumption reduction operations with different priorities, and $P_i$ in the first target condition is a power consumption gain obtained by performing a power consumption reduction operation with a lowest priority on the $i^{th}$ candidate service; and the method further comprises:

if the first n candidate services and the target running duration that satisfy the first target condition are not detected, sequentially monitoring the N candidate services in ascending order of the priorities of the N candidate services and in ascending order of priorities of power consumption reduction operations of each candidate service until at least one target power consumption reduction operation of each candidate service and target running duration that satisfy a second target condition are detected, wherein the second target condition comprises:

$$P_0 \times T_0 + (P_0 - A) \times (T - T_0) + (P_0 - B) \times (T_p - T) \le C_0 \times V,$$

and $T \ge T_0$, wherein $$A = \sum_{j=1}^{m_i-1} \sum_{i=1}^{N} (P_{i\_j} - P_{i\_j-1}) + \sum_{i=1}^{n-1} (P_{i\_j} - P_{i\_j-1}) \bigg| j = m_i, \text{ and}$$

$$B = \sum_{j=1}^{m_i-1} \sum_{i=1}^{N} (P_{i\_j} - P_{i\_j-1}) + \sum_{i=1}^{n} (P_{i\_j} - P_{i\_j-1}) \bigg| j = m_i, \text{ wherein}$$

$M_i$ is a quantity of power consumption reduction operations with different priorities of the $i^{th}$ candidate service, the first $m_i$ power consumption reduction operations of the $i^{th}$ candidate service are target power consumption reduction operations of the $i^{th}$ candidate service, $m_i$ is a positive integer that is not greater than $M_i$, j is a positive integer that is not greater than $m_i$, $P_{i\_j}$ is a power consumption gain obtained by performing the $1^{st}$ power consumption reduction operation to a $j^{th}$ power consumption reduction operation on the $i^{th}$ candidate service, and T is the target running duration; and determining the N candidate services as N target services;

wherein the controlling the electric device to perform the power consumption reduction operation on the at least one target service, when the duration that starts from the time point at which the power consumption reduction instruction is received reaches the target running duration, or when the duration that starts from the time point at which the power consumption reduction instruction is received reaches the basic running duration and the target running duration comprises:

controlling the electric device to perform at least one target power consumption reduction operation on each target service, when the duration that starts from the time point at which the power consumption reduction instruction is received reaches the basic running duration, wherein for an $i^{th}$ target service, if i=n, a target power consumption reduction operation performed on the $i^{th}$ target service is the first $m_i$−1 power consumption reduction operations in $M_i$ power consumption reduction operations with different priorities; or if i≠n, a target power consumption reduction operation performed on the $i^{th}$ target service is the first $m_i$ power consumption reduction operations in $M_i$ power consumption reduction operations with different priorities; and controlling the electric device to perform an $m_n^{th}$ power consumption reduction operation on an $n^{th}$ target service in the N target services, when the duration that starts from the time point at which the power consumption reduction instruction is received reaches the target running duration.

5. The method of claim 2, wherein before the controlling the electric device to perform the power consumption reduction operation on the at least one target service, the method further comprises:

determining updated total power consumption, updated remaining electricity, and updated basic electricity consumption at an interval of a monitoring periodicity;

re-performing, based on the updated basic electricity consumption, the updated remaining electricity, the estimated running duration, and the power consumption gain of each candidate service, the operation of determining at least one target service and determining target running duration; and controlling, if the at least one re-determined target service and/or the re-determined target running duration change/changes, the electric device to perform the power consumption reduction operation based on at least one changed target service and/or changed target running duration.

6. The method of claim 1, wherein before the duration that starts from the time point at which the power consumption reduction instruction is received reaches the basic running duration, the method further comprises:

if a power consumption restoration instruction is received, forbidding the electric device to perform the power consumption reduction operation on the at least one target service in the plurality of services.

7. The method of claim 1, wherein the electric device is further connected to a second power source, and the first power source is a backup power source of the second power source; and the power consumption reduction instruction is an instruction that indicates a power failure of the second power source.

8. The method of claim 7, wherein the second power source is a mains power source, and the method further comprises:

determining, based on historical outage data, cumulative probability distribution of historical outage duration of a region in which the electric device is located; and determining historical outage duration that corresponds to a first probability in the cumulative probability distribution as the basic running duration, wherein a value of the first probability ranges from 70% to 80%.

9. The method of claim 7, the method further comprising:

determining a total capacity of the first power source based on historical outage duration that corresponds to a second probability in the cumulative probability distribution and the total power consumption of the plurality of services, wherein a value of the second probability ranges from 85% to 95%.

10. A power consumption control device, comprising:

a processor, and a non-transitory memory storing instructions that, when executed by the processor, cause the power consumption control device to:

determine, based on a received power consumption reduction instruction, total power consumption of a plurality of services running in an electric device and remaining electricity of a first power source that is configured to supply power to an electric device;

determine, based on the total power consumption, basic electricity consumption of the plurality of services in basic running duration that starts from a time point at which the power consumption reduction instruction is received; and control, based on the basic electricity consumption, the remaining electricity and an estimated running duration, the electric device to perform a power consumption reduction operation on at least one target service in the plurality of services, after duration that starts from the time point at which the power consumption reduction instruction is received is greater than or equal to the basic running duration, wherein the estimated running duration is greater than the basic running duration, a sum of the basic electricity consumption and target electricity consumption is less than or equal to the remaining electricity, and the target electricity consumption is electricity consumption of the plurality of services in a time period between the basic running duration and the estimated running duration when the power consumption reduction operation is performed on the at least one target service in the plurality of services.

11. The device of claim 10, wherein the plurality of services comprise at least one candidate service on which the power consumption reduction operation can be performed; and wherein the instructions, when executed by the processor, further cause the power consumption control device to:

determine at least one target service from the at least one candidate service based on the basic electricity consumption, the remaining electricity, the estimated running duration and a power consumption gain of each candidate service, wherein the power consumption gain refers to power consumption that can be reduced by performing the power consumption reduction operation on the candidate service;

determine a target running duration, wherein the target running duration is less than the estimated running duration, and greater than or equal to the basic running duration; and control the electric device to perform the power consumption reduction operation on the at least one target service, when the duration that starts from the time point at which the power consumption reduction instruction is received reaches the target running duration, or when the duration that starts from the time point at which the power consumption reduction instruction is received reaches the basic running duration and the target running duration, wherein the target electricity consumption is determined based on the total power consumption and the power consumption gain of the at least one target service.

12. The device of claim 11, wherein the plurality of services comprise N candidate services, and N is an integer greater than 1; and wherein the instructions, when executed by the processor, further cause the power consumption control device to:

sequentially monitor the first n candidate services in the N candidate services in ascending order of priorities of the N candidate services until the first n candidate services and target running duration that satisfy a first target condition are detected, wherein the first target condition comprises:

$$P_0 \times T_0 + \left(P_0 - \sum_{i=1}^{n-1} P_i\right) \times (T - T_0) + \left(P_0 - \sum_{i=1}^{n} P_i\right) \times (T_p - T) \le C_0 \times V,$$

and $T \ge T_0$, wherein $P_0$ is the total power consumption, $T_0$ is the basic running duration, $P_1$ is a power consumption gain of an $i^{th}$ candidate service, $T$ is the target running duration, $T_p$ is the estimated running duration, $C_0$ is the remaining electricity, $V$ is a voltage of the first power source, i is a positive integer that is not greater than n, and n is a positive integer that is not greater than N;

determine the first n candidate services as n target services; and if n is equal to 1, control the electric device to perform the power consumption reduction operation on a $1^{st}$ target service in the n target services when the duration that starts from the time point at which the power consumption reduction instruction is received reaches the target running duration; or if n is greater than 1, perform the power consumption reduction operation on the first n−1 target services in the n target services when the duration that starts from the time point at which the power consumption reduction instruction is received reaches the basic running duration, and control the electric device to perform the power consumption reduction operation on an $n^{th}$ target service in the n target services, when the duration that starts from the time point at which the power consumption reduction instruction is received reaches the target running duration.

13. The device of claim 12, wherein at least one candidate service in the N candidate services has a plurality of power consumption reduction operations with different priorities, and $P_i$ in the first target condition is a power consumption gain obtained by performing a power consumption reduction operation with a lowest priority on the $i^{th}$ candidate service; and wherein the instructions, when executed by the processor, further cause the power consumption control device to:

if the first n candidate services and the target running duration that satisfy the first target condition are not detected, sequentially monitor the N candidate services in ascending order of the priorities of the N candidate services and in ascending order of priorities of power consumption reduction operations of each candidate service until at least one target power consumption reduction operation of each candidate service and target running duration that satisfy a second target condition are detected, wherein the second target condition comprises:

$$P_0 \times T_0 + (P_0 - A) \times (T - T_0) + (P_0 - B) \times (T_p - T) \le C_0 \times V,$$

and $T \ge T_0$, wherein $$A = \sum_{j=1}^{m_i-1} \sum_{i=1}^{N} (P_{i\_j} - P_{i\_j-1}) + \sum_{i=1}^{n-1} (P_{i\_j} - P_{i\_j-1}) \Big| j = m_i, \text{ and}$$

$$B = \sum_{j=1}^{m_i-1} \sum_{i=1}^{N} (P_{i\_j} - P_{i\_j-1}) + \sum_{i=1}^{n} (P_{i\_j} - P_{i\_j-1}) \Big| j = m_i, \text{ wherein}$$

$M_i$ is a quantity of power consumption reduction operations with different priorities of the $i^{th}$ candidate service, the first $m_i$ power consumption reduction operations of the $i^{th}$ candidate service are target power consumption reduction operations of the $i^{th}$ candidate service, $m_i$ is a positive integer that is not greater than $M_i$, j is a positive integer that is not greater than $m_i$, $P_{i\_j}$ is a power consumption gain obtained by performing the $1^{st}$ power consumption reduction operation to a $j^{th}$ power consumption reduction operation on the $i^{th}$ candidate service, and T is the target running duration;

determine the first N candidate services as N target services;

control the electric device to perform at least one target power consumption reduction operation on each target service, when the duration that starts from the time point at which the power consumption reduction instruction is received reaches the basic running duration, wherein for an $i^{th}$ target service, if i=n, the target power consumption reduction operation performed on the $i^{th}$ target service is the first $m_i$−1 power consumption reduction operations in $M_i$ power consumption reduction operations with different priorities; or if i≠n, a target power consumption reduction operation performed on the $i^{th}$ target service is the first $m_i$ power consumption reduction operations in $M_i$ power consumption reduction operations with different priorities; and control the electric device to perform an $m_n^{th}$ power consumption reduction operation on an $n^{th}$ target service in the N target services, when the duration that starts from the time point at which the power consumption reduction instruction is received reaches the target running duration.

14. The device of claim 11, wherein the instructions, when executed by the processor, further cause the power consumption control device to:

determine updated total power consumption, updated remaining electricity, and updated basic electricity consumption at an interval of a monitoring periodicity; re-perform, based on the updated basic electricity consumption, the updated remaining electricity, the estimated running duration, and the power consumption gain of each candidate service, the operation of determining at least one target service and determining target running duration; and control, if the at least one re-determined target service and/or the re-determined target running duration change/changes, the electric device to perform the power consumption reduction operation based on at least one changed target service and/or changed target running duration.

15. The device of claim 10, wherein the instructions, when executed by the processor, further cause the power consumption control device to:

if a power consumption restoration instruction is received, forbid the electric device to perform the power consumption reduction operation on the at least one target service in the plurality of services.

16. The device of claim 10, wherein the electric device is further connected to a second power source, and the first power source is a backup power source of the second power source; and the power consumption reduction instruction is an instruction that indicates a power failure of the second power source.

17. The device of claim 16, wherein the second power source is a mains power source, wherein the instructions, when executed by the processor, further cause the power consumption control device to:

determine, based on historical outage data, cumulative probability distribution of historical outage duration of a region in which the electric device is located; and determine historical outage duration that corresponds to a first probability in the cumulative probability distribution as the basic running duration, wherein a value of the first probability ranges from 70% to 80%.

18. The device of claim 16, wherein the instructions, when executed by the processor, further cause the power consumption control device to:

determine a total capacity of the first power source based on historical outage duration that corresponds to a second probability in the cumulative probability distribution and the total power consumption of the plurality of services, wherein a value of the second probability ranges from 85% to 95%.

19. A non-transitory computer-readable storage medium, wherein the non-transitory computer-readable storage medium stores a computer program, and the computer program is loaded and executed by a processor to implement the following steps:

determining, based on a received power consumption reduction instruction, total power consumption of a plurality of services running in an electric device and remaining electricity of a first power source that is configured to supply power to the electric device;

determining, based on the total power consumption, basic electricity consumption of the plurality of services in basic running duration that starts from a time point at which the power consumption reduction instruction is received; and controlling, based on the basic electricity consumption, the remaining electricity and estimated running duration, the electric device to perform a power consumption reduction operation on at least one target service in the plurality of services, after duration that starts from the time point at which the power consumption reduction instruction is received is greater than or equal to the basic running duration, wherein the estimated running duration is greater than the basic running duration, a sum of the basic electricity consumption and target electricity consumption is less than or equal to the remaining electricity, and the target electricity consumption is electricity consumption of the plurality of services in a time period between the basic running duration and the estimated running duration when the power consumption reduction operation is performed on the at least one target service in the plurality of services.

20. The non-transitory computer-readable storage medium of claim 19, wherein the plurality of services comprise at least one candidate service on which the power consumption reduction operation can be performed; and the computer program is loaded and executed by a processor to implement the following steps:

determining at least one target service from the at least one candidate service based on the basic electricity consumption, the remaining electricity, the estimated running duration, and a power consumption gain of each candidate service, and determine target running duration, wherein the target running duration is less than the estimated running duration, and greater than or equal to the basic running duration, wherein the power consumption gain refers to power consumption that can be reduced by performing the power consumption reduction operation on the candidate service; and controlling the electric device to perform the power consumption reduction operation on the at least one target service, when the duration that starts from the time point at which the power consumption reduction instruction is received reaches the target running duration, or when the duration that starts from the time point at which the power consumption reduction instruction is received reaches the basic running duration and the target running duration, wherein the target electricity consumption is determined based on the total power consumption and the power consumption gain of the at least one target service.

* * * * *